(12) United States Patent
Arasavelli et al.

(10) Patent No.: US 10,721,233 B2
(45) Date of Patent: *Jul. 21, 2020

(54) MOBILE DEVICE ENABLED TIERED DATA EXCHANGE VIA A VEHICLE

(71) Applicants: AT&T Mobility II LLC, Atlanta, GA (US); AT&T INTELLECTUAL PROPERTY I, L.P., Atlanta, GA (US)

(72) Inventors: Yehoshuva Arasavelli, Redmond, WA (US); Ginger Li Chien, Bellevue, WA (US)

(73) Assignees: AT&T INTELLECTUAL PROPERTY I, L.P., Atlanta, GA (US); AT&T MOBILITY II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/020,996

(22) Filed: Jun. 27, 2018

(65) Prior Publication Data

US 2018/0309760 A1  Oct. 25, 2018

Related U.S. Application Data

(63) Continuation of application No. 14/927,461, filed on Oct. 29, 2015, now Pat. No. 10,021,105, which is a
(Continued)

(51) Int. Cl.
*H04L 29/06* (2006.01)
*H04L 29/08* (2006.01)
(Continued)

(52) U.S. Cl.
CPC ............... *H04L 63/10* (2013.01); *H04B 7/26* (2013.01); *H04L 63/102* (2013.01);
(Continued)

(58) Field of Classification Search
CPC ....... H04L 63/10; H04L 67/30; H04L 63/105; H04L 63/102; H04L 67/12; H04W 4/80; H04B 7/26
(Continued)

(56) References Cited

U.S. PATENT DOCUMENTS 5,479,157 A   12/1995  Suman et al.
5,513,107 A    4/1996  Gormley
(Continued)

FOREIGN PATENT DOCUMENTS

AU   2004202420 A1  12/2004
JP     62-128850 A   6/1987
(Continued)

OTHER PUBLICATIONS

Davies et al. "Automatic Vehicle Identification to Support Driver Information Systems". Vehicle Navigation and Information Systems Conference, 1989. Conference Record. pp. A31-A35.
(Continued)

*Primary Examiner* — Abu S Sholeman
(74) *Attorney, Agent, or Firm* — Amin, Turocy & Watson, LLP

(57) ABSTRACT

A mobile device enabled tiered data exchange via a vehicle is disclosed. A mobile device can access profile information related to a tiered-data sharing profile. The tiered-data sharing profile can associate data with a sharing tier designating security, privacy, or authorization constraints on sharing the associated data. A sharing tier can further designate obfuscation of the data as a constraint on sharing the data. The mobile device can enable access to the data subject to the constraints of the tiered-data sharing profile. In an embodiment, tiered data can be shared from the mobile device to an external service device via vehicle device. In
(Continued)

another embodiment, tiered data can be shared from the mobile device to a service device of the vehicle.

20 Claims, 10 Drawing Sheets

Related U.S. Application Data continuation of application No. 14/075,784, filed on Nov. 8, 2013, now Pat. No. 9,203,843.

(51) Int. Cl.
  *H04W 4/80* (2018.01)
  *H04B 7/26* (2006.01)
(52) U.S. Cl.
  CPC ............ *H04L 63/105* (2013.01); *H04L 67/12* (2013.01); *H04L 67/30* (2013.01); *H04W 4/80* (2018.02)
(58) Field of Classification Search
  USPC ......................................................... 726/29
  See application file for complete search history.

(56) References Cited

U.S. PATENT DOCUMENTS

| | | | |
|---|---|---|---|
| 5,534,845 A | 7/1996 | Issa et al. | |
| 5,664,948 A | 9/1997 | Dimitriadis et al. | |
| 5,905,247 A | 5/1999 | Ilen | |
| 6,031,465 A | 2/2000 | Burgess | |
| 6,112,152 A | 8/2000 | Tuttle | |
| 6,122,580 A | 9/2000 | Autermann | |
| 6,198,996 B1 | 3/2001 | Berstis | |
| 6,205,374 B1 | 3/2001 | Kljima et al. | |
| 6,225,890 B1 | 5/2001 | Murphy | |
| 6,236,337 B1 | 5/2001 | Beier et al. | |
| 6,240,365 B1 | 5/2001 | Bunn | |
| 6,282,475 B1 | 8/2001 | Washington | |
| 6,282,491 B1 | 8/2001 | Bochmann et al. | |
| 6,317,721 B1* | 11/2001 | Hurta | G06Q 20/363 |
| | | | 235/384 |
| 6,330,499 B1 | 12/2001 | Chou et al. | |
| 6,344,804 B1 | 2/2002 | Koga | |
| 6,396,389 B1 | 5/2002 | Nakano et al. | |
| 6,427,115 B1 | 7/2002 | Sekiyama | |
| 6,430,488 B1 | 8/2002 | Goldman et al. | |
| 6,584,381 B2 | 6/2003 | Gehrke | |
| 6,615,123 B2 | 9/2003 | Morehouse | |
| 6,640,169 B2 | 10/2003 | Bergmann et al. | |
| 6,663,010 B2 | 12/2003 | Chene et al. | |
| 6,718,240 B1 | 4/2004 | Suda et al. | |
| 6,731,925 B2 | 5/2004 | Naboulsi | |
| 6,775,603 B2 | 8/2004 | Yester et al. | |
| 6,823,317 B1 | 11/2004 | Ouimet et al. | |
| 6,882,906 B2 | 4/2005 | Geisler et al. | |
| 6,898,493 B2 | 5/2005 | Ehrman et al. | |
| 6,923,370 B2 | 8/2005 | Gotfried et al. | |
| 6,937,138 B2 | 8/2005 | Underdahl | |
| 6,989,762 B2 | 1/2006 | Fraenkel et al. | |
| 7,072,753 B2 | 7/2006 | Eberle et al. | |
| 7,099,750 B2 | 8/2006 | Miyazawa et al. | |
| 7,289,611 B2 | 10/2007 | Iggulden et al. | |
| 7,301,441 B2 | 11/2007 | Inada et al. | |
| 7,415,339 B2 | 8/2008 | Ikeda et al. | |
| 7,636,045 B2 | 12/2009 | Sugiyama et al. | |
| 7,668,931 B2 | 2/2010 | Parupudi et al. | |
| 7,751,944 B2 | 7/2010 | Parupudi et al. | |
| 7,752,098 B2 | 7/2010 | Matsutani | |
| 7,912,625 B2 | 3/2011 | Cahoon | |
| 8,271,187 B2 | 9/2012 | Taylor et al. | |
| 8,326,259 B2 | 12/2012 | Gautama et al. | |
| 8,352,115 B2 | 1/2013 | Mathieson et al. | |
| 8,370,030 B1 | 2/2013 | Gurin | |
| 8,421,589 B2 | 4/2013 | Sultan et al. | |
| 8,421,629 B2 | 4/2013 | Carr | |
| 8,463,488 B1 | 6/2013 | Hart | |
| 8,483,453 B2 | 7/2013 | Yang et al. | |
| 8,509,987 B2 | 8/2013 | Resner | |
| 8,526,925 B2 | 9/2013 | Zellner et al. | |
| 8,635,018 B2 | 1/2014 | Chia et al. | |
| 8,819,182 B2 | 8/2014 | Howarter et al. | |
| 8,935,052 B2 | 1/2015 | Hermann | |
| 8,954,231 B1 | 2/2015 | Song et al. | |
| 9,032,493 B2 | 5/2015 | Lortz et al. | |
| 9,032,547 B1 | 5/2015 | Hohler et al. | |
| 9,108,582 B1 | 8/2015 | Kozloski et al. | |
| 9,123,034 B2* | 9/2015 | Rydbeck | G06Q 20/145 |
| 9,124,650 B2* | 9/2015 | Maharajh | G06F 21/10 |
| 9,203,843 B2* | 12/2015 | Arasavelli | H04B 7/26 |
| 9,204,257 B1 | 12/2015 | Mendelson | |
| 9,246,671 B2 | 1/2016 | Brahner et al. | |
| 9,481,326 B2 | 11/2016 | Chatterjee | |
| 9,621,661 B2 | 4/2017 | Diem | |
| 10,235,816 B2* | 3/2019 | Dutta | G06Q 10/02 |
| 2001/0035811 A1 | 11/2001 | Dewan | |
| 2002/0109583 A1 | 8/2002 | Losey | |
| 2002/0190842 A1 | 12/2002 | Sasaki et al. | |
| 2003/0057773 A1 | 3/2003 | Sasaki et al. | |
| 2003/0076968 A1 | 4/2003 | Rast | |
| 2003/0096641 A1 | 5/2003 | Odinak | |
| 2003/0112121 A1 | 6/2003 | Wilson | |
| 2003/0152088 A1 | 8/2003 | Kominami et al. | |
| 2004/0027237 A1 | 2/2004 | Magner et al. | |
| 2004/0027238 A1 | 2/2004 | Magner et al. | |
| 2004/0061591 A1 | 4/2004 | Teich | |
| 2004/0104815 A1 | 6/2004 | Suyama et al. | |
| 2004/0110472 A1 | 6/2004 | Witkowski et al. | |
| 2004/0176969 A1 | 9/2004 | Fujinuma | |
| 2006/0143463 A1 | 6/2006 | Ikeda et al. | |
| 2006/0155439 A1 | 7/2006 | Slawinski et al. | |
| 2006/0157563 A1 | 7/2006 | Marshall | |
| 2007/0067415 A1 | 3/2007 | Kawaguchi | |
| 2007/0124046 A1 | 5/2007 | Ayoub et al. | |
| 2008/0148391 A1 | 6/2008 | Nakamura | |
| 2008/0203145 A1 | 8/2008 | Martins | |
| 2009/0016418 A1 | 1/2009 | Silver et al. | |
| 2009/0075630 A1 | 3/2009 | McLean | |
| 2009/0243793 A1 | 10/2009 | Hsu | |
| 2009/0290718 A1 | 11/2009 | Kahn et al. | |
| 2009/0326791 A1 | 12/2009 | Horvitz et al. | |
| 2010/0036560 A1 | 2/2010 | Wright et al. | |
| 2010/0082479 A1 | 4/2010 | Erhart et al. | |
| 2010/0113013 A1 | 5/2010 | Karabinis et al. | |
| 2010/0188248 A1 | 7/2010 | Sultan et al. | |
| 2010/0280956 A1 | 11/2010 | Chutorash et al. | |
| 2010/0305807 A1 | 12/2010 | Basir et al. | |
| 2011/0009156 A1 | 1/2011 | Goodwin et al. | |
| 2011/0015934 A1 | 1/2011 | Rowe et al. | |
| 2011/0043496 A1 | 2/2011 | Ray Avalani | |
| 2011/0136429 A1* | 6/2011 | Ames | H04B 5/02 |
| | | | 455/41.1 |
| 2011/0155803 A1 | 6/2011 | Nieuwland et al. | |
| 2011/0184971 A1 | 7/2011 | Lin et al. | |
| 2011/0225228 A1 | 9/2011 | Westra et al. | |
| 2011/0225417 A1* | 9/2011 | Maharajh | G06F 21/10 |
| | | | 713/150 |
| 2011/0246246 A1 | 10/2011 | Johnson | |
| 2011/0257810 A1 | 10/2011 | Leger | |
| 2011/0288891 A1 | 11/2011 | Zaid et al. | |
| 2012/0066419 A1 | 3/2012 | Park et al. | |
| 2012/0068837 A1 | 3/2012 | Balakrishnan et al. | |
| 2012/0095643 A1 | 4/2012 | Bose et al. | |
| 2012/0159170 A1 | 6/2012 | Lee et al. | |
| 2012/0215375 A1 | 8/2012 | Chang | |
| 2012/0254960 A1* | 10/2012 | Lortz | H04L 63/104 |
| | | | 726/7 |
| 2012/0265995 A1 | 10/2012 | Kherani et al. | |
| 2013/0018705 A1 | 1/2013 | Heath et al. | |
| 2013/0046592 A1 | 2/2013 | Ross | |
| 2013/0066688 A1 | 3/2013 | Pinkus | |
| 2013/0073349 A1 | 3/2013 | Kolling | |
| 2013/0082820 A1 | 4/2013 | Tieman | |
| 2013/0090781 A1 | 4/2013 | Gellatly et al. | |

(56) References Cited

U.S. PATENT DOCUMENTS

| | | |
|---|---|---|
| 2013/0117857 A1 | 5/2013 | Zimmermann |
| 2013/0132286 A1 | 5/2013 | Schaefer et al. |
| 2013/0151035 A1 | 6/2013 | Park et al. |
| 2013/0151063 A1 | 6/2013 | Baughman et al. |
| 2013/0166106 A1 | 6/2013 | Nakagawa |
| 2013/0197674 A1 | 8/2013 | Lowry |
| 2013/0204455 A1 | 8/2013 | Chia et al. |
| 2013/0226371 A1 | 8/2013 | Rovik et al. |
| 2013/0245858 A1 | 9/2013 | Yonehara |
| 2013/0246132 A1* | 9/2013 | Buie .................. G06Q 20/20 705/13 |
| 2013/0246280 A1 | 9/2013 | Kirsch |
| 2013/0261941 A1 | 10/2013 | Nishimura et al. |
| 2013/0274953 A1 | 10/2013 | Miljkovic et al. |
| 2013/0281067 A1 | 10/2013 | Takizawa et al. |
| 2013/0282448 A1* | 10/2013 | Rydbeck ............. G06Q 20/145 705/13 |
| 2013/0293349 A1 | 11/2013 | Templ et al. |
| 2013/0345903 A1 | 12/2013 | Nakagawa |
| 2014/0052345 A1 | 2/2014 | Tobin |
| 2014/0055232 A1 | 2/2014 | Yoshizawa |
| 2014/0079217 A1 | 3/2014 | Bai et al. |
| 2014/0091903 A1 | 4/2014 | Birkel et al. |
| 2014/0096217 A1 | 4/2014 | Lehmann |
| 2014/0128144 A1 | 5/2014 | Bavitz et al. |
| 2014/0155052 A1 | 6/2014 | Glover |
| 2014/0169634 A1 | 6/2014 | Prakash et al. |
| 2014/0172990 A1 | 6/2014 | Wan et al. |
| 2014/0187149 A1 | 7/2014 | Lortz et al. |
| 2014/0310788 A1 | 10/2014 | Ricci |
| 2014/0366125 A1 | 12/2014 | Murata et al. |
| 2014/0379920 A1 | 12/2014 | Nathwani et al. |
| 2014/0380505 A1 | 12/2014 | Camacho et al. |
| 2015/0024686 A1 | 1/2015 | Hrabak |
| 2015/0091508 A1 | 4/2015 | Meunier et al. |
| 2015/0112512 A1 | 4/2015 | Fan et al. |
| 2015/0120402 A1 | 4/2015 | Ahmed et al. |
| 2015/0127215 A1 | 5/2015 | Chatterjee |
| 2015/0134428 A1 | 5/2015 | Li et al. |
| 2015/0149263 A1 | 5/2015 | Stenneth et al. |
| 2015/0156010 A1 | 6/2015 | Brahner et al. |
| 2015/0221140 A1 | 8/2015 | Eid |
| 2016/0101786 A1 | 4/2016 | Johnson |
| 2016/0241999 A1 | 8/2016 | Chin et al. |
| 2017/0318612 A1 | 11/2017 | Gu et al. |
| 2017/0345304 A1 | 11/2017 | Oesterling et al. |

FOREIGN PATENT DOCUMENTS

| | | |
|---|---|---|
| JP | H02-60856 A | 3/1990 |
| JP | H03-258633 A | 11/1991 |
| JP | H07-232602 A | 9/1995 |
| JP | 2002-104105 A | 4/2002 |
| JP | 2009-262654 A | 11/2009 |
| JP | 2010-163092 A | 7/2010 |
| WO | 2012/160298 A1 | 11/2012 |

OTHER PUBLICATIONS

Fruechte et al. "Integrated Vehicle Control" IEEE 39th Vehicular Technology Conference, 1989, vol. 2, pp. 868-877.

Smartphones are the Key to Car Sharing of the Future Continental Corporation <http://www.continental-corporation.com> Retrieved on Sep. 14, 2013, 2 pages.

Kuemmerling, et al., "Seamless Mobility: Individual Mobility Profiles for a Better Ushability of Shared Vehicles." HCI International 2013—Posters Extended Abstracts. Springer Berlin Heidelberg, 2013. 318-322. <http://link.springer.com/chapter/10.1007/978-3-642-39476-8_65>. Retrieved on Sep. 14, 2013, 3 pages.

Wang, et al., "Real time services for future cloud computing enabled vehicle networks". Wireless Communications and Signal Processing (WCSP), 2011 International Conference on. IEEE, 2011. <http://dx.doi.org/10.1109/WCSP.2011.6096957>. Retrieved on Sep. 14, 2013, 1 page.

Barth, et al., "Shared-use vehicle systems: Framework for classifying carsharing, station cars, and combined approaches." Transport Research Record: Journal of the Transportation Research Board 1791.1 (2002): 105-112. <http://trb.metapress.com/content/h5507j33nh8k7v50/fulltext.pdf?page=1> Retrieved on Sep. 14, 2013, 3 pages.

Office Action dated Feb. 20, 2015 for U.S. Appl. No. 14/075,784, 33 pages.

Office Action dated Apr. 7, 2015 for U.S. Appl. No. 14/057,708, 26 pages.

Notice of Allowance dated Jul. 30, 2015 for U.S. Appl. No. 14/075,784, 57 pages.

Final Office Action dated Sep. 16, 2015 for U.S. Appl. No. 14/057,708, 24 pages.

Non-Final Office Action dated Apr. 20, 2016 for U.S. Appl. No. 14/057,708, 21 pages.

Non-Final Office Action dated Feb. 17, 2016 for U.S. Appl. No. 14/927,461, 45 pages.

Final Office Action dated Aug. 16, 2016 for U.S. Appl. No. 14/927,461, 71 pages.

Final Office Action dated Sep. 30, 2016 for U.S. Appl. No. 14/057,708, 23 pages.

Office Action dated Mar. 15, 2017 for U.S. Appl. No. 14/927,461, 43 pages.

Final Office Action dated Sep. 11, 2017 for U.S. Appl. No. 14/927,461, 55 pages.

Notice of Allowance dated Mar. 12, 2018 for U.S. Appl. No. 14/927,461, 75 pages.

Office Action dated Sep. 5, 2019 for U.S. Appl. No. 15/788,715, 52 pages.

Final Office Action dated Mar. 25, 2020 for U.S. Appl. No. 15/788,715, 44 pages.

\* cited by examiner

MOBILE DEVICE ENABLED TIERED DATA EXCHANGE VIA A VEHICLE

CROSS REFERENCE TO RELATED APPLICATION

This application is a continuation of, and claims priority to each of, U.S. patent application Ser. No. 14/927,461 (now U.S. Pat. No. 10,021,105), filed on 29 Oct. 2015, and entitled "MOBILE DEVICE ENABLED TIERED DATA EXCHANGE VIA A VEHICLE," which is a continuation of U.S. patent application Ser. No. 14/075,784, filed on 8 Nov. 2013, now issued as U.S. Pat. No. 9,203,843, and entitled "MOBILE DEVICE ENABLED TIERED DATA EXCHANGE VIA A VEHICLE," the entireties of which applications are hereby incorporated by reference herein.

TECHNICAL FIELD

The disclosed subject matter relates to adaptation of a vehicle related to tiered data exchange via a mobile device.

BACKGROUND

By way of brief background, modern vehicles can include adaptable subsystems. These adaptable subsystems can facilitate adaptation of the vehicle to improve usability of the vehicle. As an example, mobile devices can include an identifier allowing a vehicle to adjust seats to preset conditions associated with the identifier, allowing a vehicle to adjust radio station settings to a set associated with the identifier, etc. Further, some mobile devices can be used directly as transponders to interface with systems external to a vehicle, e.g., tollbooths, toll in motion, etc., allowing a mobile device inside a vehicle to interact with said external systems.

DETAILED DESCRIPTION

Figure 1:
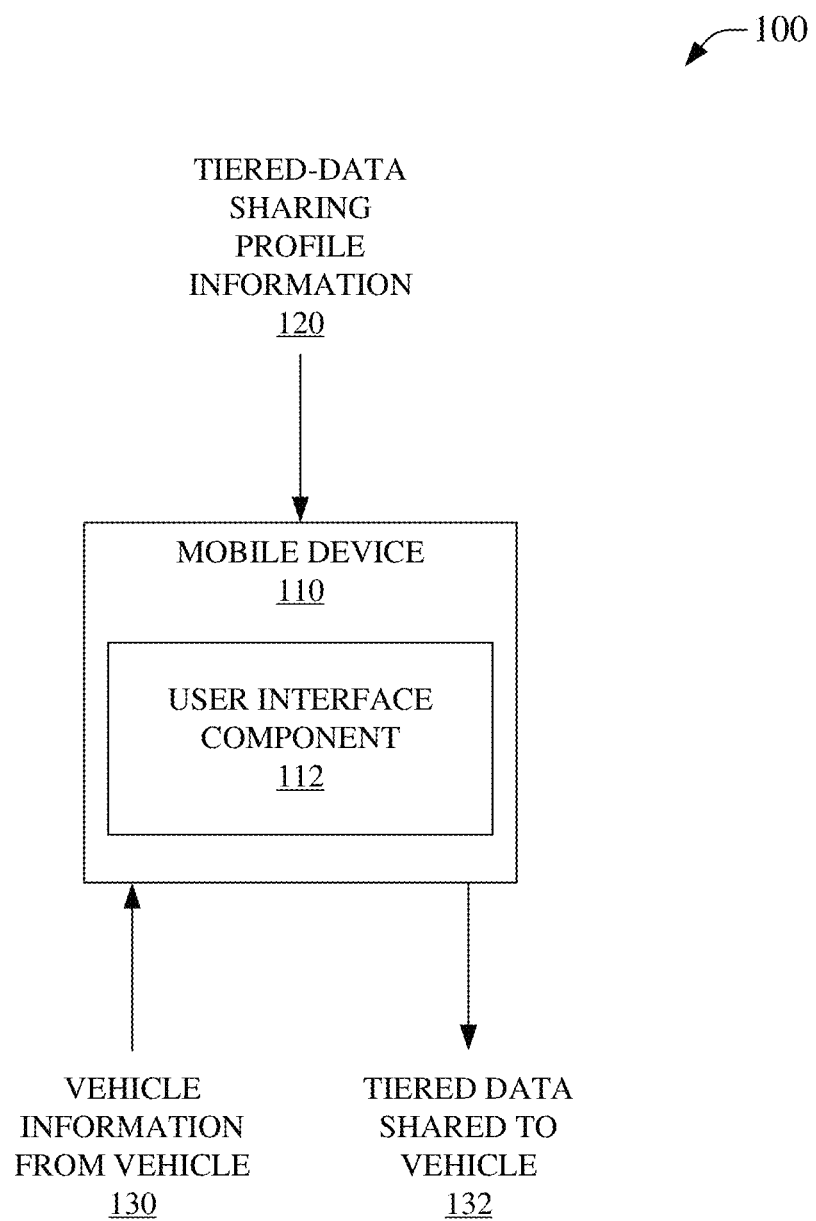
FIG. 1 is an illustration of a system that facilitates employing a mobile device enabled tiered data exchange for vehicle adaptation in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional vehicles can employ many manually adjustable systems, such as, radio stations, seat adjustments, pedal position adjustments, climate control settings, etc. Some newer vehicles have advanced adjustment systems that can store settings for adjustable vehicle subsystems, e.g., storing sets of seat adjustments that can allow the seat to adjust several parameters at the touch of a single button. In some instances, these stored vehicle subsystem adjustments can be activated by items such as computerized keys, key fobs, etc., e.g., when a computerized key is inserted in the ignition, the vehicle can automatically adjust the seat based on settings associated with the particular key inserted in the ignition.

Further, some newer vehicles can be associated with information sharing devices. These data sharing devices can share data wirelessly, visually, or audibly. As an example, a toll transponder can comprise a radio frequency identification (RFID) device, a Wi-Fi or BLUETOOTH device, etc. As another example, a parking pass device can comprise a display that displays an image that can comprise a barcode, quick response (QR) code or other type of multi-dimensional code, a letter and/or number code, a code comprising symbols, etc., that can enable a reader to visually capture the displayed image to verify that the associated vehicle is permitted to park at that parking facility, or to charge an account associated with the image to pay for parking at that parking facility. In another example, an audio transponder can generate an audio code that can effect payment or verification of permission to use a service. However, conventionally, these information sharing devices can be typically preconfigured by a user associated with the vehicle or by an organization associate with a service relating to the sharing device. As an example, a toll transponder for a particular bridge crossing can be programmed by the toll authority before being given to a user to place in their vehicle. As such, these types of information sharing devices can be associated with a limited number of uses, e.g., a toll transponder may not be able to be programmed with parking pass information, thus causing a user to carry a second information sharing device where parking pass service is also needed. Further, these devices can lack security features, for example, where a toll pass transponder is stolen, it can often be used by the thief because it can lack user authentication.

Additionally, these conventional systems can be generally strongly tied to individual vehicles or drivers. As an example, in most conventional systems, a computerized key fob can be associated with a seat adjustment for a first vehicle, however the same key fob would not typically cause seat adjustment in a second vehicle. As such, a driver who has a programmed seat adjustment associated with a key fob for her personal vehicle would not generally be able to rent another vehicle, even of the same make and model, and expect the programmed seat adjustment to work in the rented vehicle based on the presence of the key fob. Similarly, for example, a parking pass display for a first user will often be associated with the user's account and a second user could not use the same parking pass display for a second user account. As another example, rental vehicles can include toll transponders that bill the rental car agency and then the rental car agency bills the customer for tolls charged to the rental car agency. Where an information sharing device can be adapted to display information related to particular individuals, users, or profiles, a single information display device in a rental vehicle could display information such that the relevant user is charged for tolls directly rather than via the rental car agency. This can improve the privacy of the renter because the rental car agency does not have a list of toll charges incurred by the renter. Similarly, where a driver owns several vehicles, conventional systems would not generally allow an information sharing device of each vehicle to share information to services relevant to the particular user of that vehicle. Moreover, as car sharing services become increasingly popular, information sharing devices that can interact with internal or external services based on the particular vehicle user can present opportunities for monetization of services, improved privacy, improved security of data, and a reduction in the number of information sharing devices needed to provide access to multiple external or internal services.

In comparison to conventional systems, sharing of data with a vehicle information sharing device via a mobile device, in accord with the instant specification, can facilitate access to driver or passenger sharing profile information. This access to driver or passenger sharing profile information can be employed to enable adaptation of the vehicle information sharing device. A mobile device can enable adaptation of a vehicle based information sharing devices across vehicles, unlike typical systems, allowing a user, e.g., a driver or passenger, to carry sharable data with them into whatever vehicle they are associated with in real time, e.g., a rental car, a friend's car, a shared car, a bus, a vanpool, etc. As an example, a user can have a toll transponder account, a parking pass account credit, and a bank account associated with a data sharing profile. This user can then access the data sharing profile via a mobile device such that when they drive to work in the morning, a vehicle information sharing device can be updated with the data for the data sharing profile allowing the vehicle information sharing device to effect payment of a freeway toll on the drive in, allow access to the parking garage as they arrive at work, and pay for energy from their bank account as they recharge their vehicle in the garage during the day. Further, when the user goes borrows a friend's truck to run an errand, the truck information sharing device can be updated with the user data from the profile such that additional freeway tolls are charge to the user account rather than to the truck owner's account. Similarly, where the user borrows their spouse's vehicle the following day to go to work, the spouse's vehicle information sharing device can be updated with the user's data so that the user's accounts are charged for tolls, parking, etc. Then when a user flies to another city for business, when the user rents a vehicle at the airport, that vehicle information sharing device can be updated with the user's data enabling the user to purchase in-vehicle services such as in-vehicle GPS, satellite radio, etc. Moreover, as the user drives around in the other city, their bank account can be charged for external services such as tolls, parking, car washes, etc., via the vehicle information sharing system.

In an aspect, some data can be treated with different levels of security or privacy protections to give the user a sense of safety in using a data sharing profile with a vehicle information sharing device. As such, data can be classified in different tiers, each associated with a defined level of privacy and security. Tiered data can comprise data associated with a determined level of data security. This data associated with a determined level of data security can be shared data. Further, this data associated with a determined level of data security can be included in profile information related to sharing the data. As an example, a first tier can include openly shared data, for example, radio station preset stations, seat adjustment position information, speed alert preferences, etc., that may not be associated with any security or authorization protocol and that can be shared with any vehicle the mobile device is associated with. As another example, a second tier can include more sensitive data that can be associated with an authorization to share, this more sensitive data could include a QR code for entrance to a parking garage, an RF code for a garage door opener, etc., such that once the authorization to share has been received, the vehicle information sharing device can be given the information for use. The more sensitive data could also be associated with rules for use, expiration times, geofencing parameters, expiration proximities, etc., so that, for example, the authorization can be valid so long as the user does not move the mobile device more than 100 feet from the vehicle for more than 10 hours, allowing the user to keep the authorization in the vehicle while she is at work, asleep at home, etc., but the authorization expires if she goes on vacation and leaves the car at home, etc. Further, where the user hops in a friend's vehicle, the data would not be shared without authorization. As a further example, highly sensitive data can be associated with a third tier that shares a token representation of the data rather than the data itself, such as sharing a token allowing payment for parking from a bank account without sharing the bank account information itself with the external parking service. These tokens can be exchanged, for example, via a reconciliation service provider, with the mobile service provider, with a bank, etc. The tokens can also be associated with rules, such as expiration conditions, time limits, value limits, secondary authorization, etc., so that, for example, a token can be shared with the vehicle information sharing device allowing the information sharing device to pay for vehicle recharging for three days. The token can then be shared, via the vehicle information sharing device, with an external vehicle recharging service for three days without exposing the actual bank account information with the vehicle recharging service. It will be noted that numerous other tiers can be employed and that each tier can be associated with rules relating to the security, privacy, and sharing of the data associated with that tier.

Sharing of tiered data with the vehicle information sharing device can be by wired or wireless links. In an aspect, a mobile device can share tiered data with vehicle information sharing device by cellular, Wi-Fi, BLUETOOTH, NFC, ZIGBEE, etc. Similarly, a mobile device can share tiered data with vehicle information sharing device by USB cable, FIREWIRE cable, etc. Sharing of tiered data can be subject to rules or authorization. In an aspect, authorization can be performed on the mobile device, e.g., by password, fingerprint, voice command, iris scan, etc. Similarly, authorization can be performed via the vehicle or vehicle information sharing device, e.g., a password can be entered into a vehicle user interface, etc. Further, authorization can comprise other user interfaces, e.g., a web based profile can be set to enable access to certain data or tiers of data, the user can then enter a password into the vehicle user interface, and then the vehicle can query the mobile device for approval, whereby the user can approve the request for the data on the mobile device user interface. It will be appreciated that nearly any mechanism for authentication or authorization can be employed without departing from the scope of the instant disclosure.

In an aspect, a mobile device can enable a vehicle information sharing device to access tiered data by way of tiered-data sharing profile information. Tiered-data sharing profile information can be stored on the mobile device, stored external to the mobile device, or both. Similarly, tiered data can be stored on the device, external to the mobile device, or both. Moreover, tiered data shared with a vehicle information sharing device can be stored on the vehicle information sharing device. In an embodiment, tiered data shared with the vehicle information sharing device is not stored on the vehicle information sharing device and only shared via the vehicle information sharing device as a conduit. This can improve security and privacy of tiered data shared via the vehicle. For example, where the vehicle information sharing system does not have a local copy of the tiered data, the tiered data is not resident should the vehicle be stolen in an attempt to hack into the vehicle information sharing device to recover tiered data. In an embodiment, tiered data can be cached in a volatile memory of the vehicle information sharing device so that it is only resident while the vehicle information sharing device is powered on, thereby reducing data transmission but still providing some security for the data by not keeping tiered data in a non-volatile memory of the vehicle information sharing device.

In an embodiment, a mobile device can perform operations comprising receiving profile information related to sharing data associated with a determined level of data security and receiving vehicle information related to a vehicle. Based on the profile information and the vehicle information, the mobile device can determine signal information related to sharing content information with a service device in accord with a constraint associated with the determined level of data security. Further, the mobile device can facilitate access to the signal information for a device of the vehicle to enable sharing of the content information with the service device.

In another embodiment, a method can comprise receiving profile information associated with a user identity, data, and a determined level of data security for the data. The method can further comprise the mobile device receiving vehicle information related to a vehicle. Based on receiving an approval input, the mobile device of the method can associate the profile information with the vehicle. Further, based on the profile information and the vehicle information, the method can comprise determining, by the mobile device, content information related to account data associated with the user identity, wherein the content information is accessible to a service device in response to a constraint associated with the determined level of data security being determined to be satisfied. The method can also comprise the mobile device facilitating access to the content information for a device of the vehicle to enable sharing of the content information with the service device.

Moreover, in further embodiment, a computer readable storage device can cause a mobile device to profile information associated with an identity of a subscriber, a set of information, and a determined level of information security for information of the set of information. The system can further receive vehicle information. Based on a constraint associated with the determined level of information security, the system can determine content information related to account information associated with the identity, wherein the content information is sharable with a service device. The system can also facilitate sharing of the content information, based on the vehicle information, to the service device via a device of the vehicle.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates employing a mobile device enabled tiered data exchange for vehicle adaptation in accordance with aspects of the subject disclosure. System 100 can include mobile device 110. Mobile device 110 can be a smartphone, tablet computer, laptop computer, or any other type of mobile device.

Mobile device 110 can comprise user interface (UI) component 112. UI component 112 can receive an indication from a user of mobile device 110. The indication can be related to sharing tiered data with a vehicle, e.g., a vehicle information sharing device (not illustrated) of the vehicle. Nearly any vehicle subsystem can be subject to adaptation or control based on information related to shared tiered data. As an example, headlights can be adapted to flash codes that can be used to pay a toll fee, a stereo system can be adapted to play an audio code to pay the toll fee, a visually readable display can be adapted to display a scannable bar code, a vehicle BLUETOOTH transceiver can be adapted to transmit a signal to effect payment of the toll fee, etc. Further, a vehicle can comprise a dedicated tiered data sharing device to share data that can effect payment of the toll fee. As such, for clarity and brevity, sharing tiered data via a vehicle can be discussed in terms of employing a 'vehicle information sharing device', which term can be read to comprise a dedicated device(s) and/or any other vehicle subsystem, unless explicitly stated to the contrary. Further, as stated herein, a vehicle information sharing device can share information with an internal and/or external service by way of RF, images, light energy (including infrared signals), audio tones, etc. With this in mind, it will be noted that a vehicle can employ more than one subsystem to share information, e.g., flashing headlights, audio tones on the stereo, and RF codes from a BLUETOOTH adapter, to share information with one or more internal or external services based on information related to a tiered-data sharing profile.

In an aspect, UI component 112 can be employed to implement authorization or approval related to sharing tiered data with a vehicle, e.g., a vehicle information sharing device. As an example, UI component 112 can receive a password, fingerprint, voice print, iris scan, etc. as part of authorizing sharing of tiered-data with the vehicle.

In another aspect, UI component 112 can be employed to directly input tiered data into mobile device 110. This can populate a tiered-data sharing profile. The profile can be stored on the device or external to the device, e.g., on a server by uploading the tiered data input and/or profile to the server. A tiered-data sharing profile can also be created external to the mobile device and can be received by the device as tiered-data sharing profile information 120. A tiered-data sharing profile can comprise data to be shared, the data associated with a level or tier of sharing associated with security rules, privacy rules, authorization rules, etc. As an example, the tiered-data sharing profile can include a bank account number associated with a high sensitivity tier. This high sensitivity tier can be, for example, associated with sharing a digital token of data, hereinafter a token, rather than the data itself, an authorization rule requiring a user to input a fingerprint on a mobile device, a rule indicating that the token is valid for 4 hours, a rule that the token is valid for use in a designated geographic area only, etc. As such, when a battery charging station, to charge a battery of the vehicle, requests a payment from the vehicle by transmitting an RF signal to the vehicle, the vehicle affiliated with the tiered-data sharing profile can then verify that a mobile device associated with the tiered-data sharing profile is within the designated geographic area. The vehicle can then request fingerprint authorization via the mobile device. The fingerprint can be received by way of UI component 112 of mobile device 110. Next, the vehicle can share a token with the battery charging service. The token can be redeemed by a reconciling system of the battery charging service up to 4 hours after the token is issued. Redemption of the token results in funds being paid to the charging service corresponding to funds being withdrawn from the bank account identified in the tiered-data sharing profile without sharing the bank account number with the charging service. Tokens can employ nearly any technique enabling improved security, privacy, or usability in comparison to not using such techniques. Examples of such techniques can include federation, OAUTH, root certificate based validation, online validation, etc., that can facilitate desirable token traits, such as non-repudiability, non-reusability, etc.

Vehicle information from vehicle 130 can be received by mobile device 110. Vehicle information from vehicle 130 can be received via a wired or wireless link between the vehicle and mobile device 110. Vehicle information from vehicle 130 can comprise identification information, parameter information, subsystems information, vehicle information sharing device information, etc. Vehicle information from vehicle 130 can enable mobile device 110 to associate a vehicle with tiered-data sharing profile information 120. In an embodiment, vehicle information from vehicle 130 can be from a vehicle in close proximity to mobile device 110, e.g., where mobile device 110 is within the vehicle. Vehicle information from vehicle 130 can be used to request authentication of the vehicle from a user associated with a tiered-data sharing profile, such as by presenting information about the vehicle to the user via UI component 112 and requesting that the user approve associating the vehicle, e.g., vehicle information sharing device, with the tiered-data sharing profile of the user. In an embodiment, this association can persist such that a user does not need to approve a vehicle each time they get in it. In another embodiment, the association can be non-persistent, such that the user is always asked to authorize a vehicle. Further embodiments can include association persistence rules. These rules can, for example, persist some vehicle associations and not others, can persist a vehicle association for a determined time, persist a vehicle association so long as a determined number of new associations have not been created, etc. As such, a user could designate rules that, for example, cause his personal car to have a persistent association until he has associated with two other vehicles or the association is more than 3 months old.

Mobile device 110 can enable access to tiered-data shared to vehicle 132. Mobile device 110 can share information to the vehicle, e.g., tiered-data shared to vehicle 132, based on tiered-data sharing profile information 120 and vehicle information from vehicle 130. Information shared with the vehicle, e.g., with a vehicle information sharing device, can enable the vehicle to share this information with internal or external service devices (not illustrated). As an example, tiered-data shared to vehicle 132 can enable a vehicle information sharing device to share a toll pass QR code by generating an image of the QR code on a display that can be read by a toll booth device. As another example, tiered-data shared to vehicle 132 can enable a vehicle information sharing device to share a parking pass RF signal with a parking garage RF receiver. As a further example, tiered-data shared to vehicle 132 can enable a vehicle information sharing device to share a token, subject to authorization via UI component 112, with an in-vehicle radio device to purchase a subscription to a satellite radio service. It will be noted that nearly any service can be interacted with by a vehicle information sharing device to allow tiered-data sharing via mobile device 110 without departing from the scope of the subject disclosure and that not all examples are presented herein simply for the sake of clarity and brevity.

Figure 2:
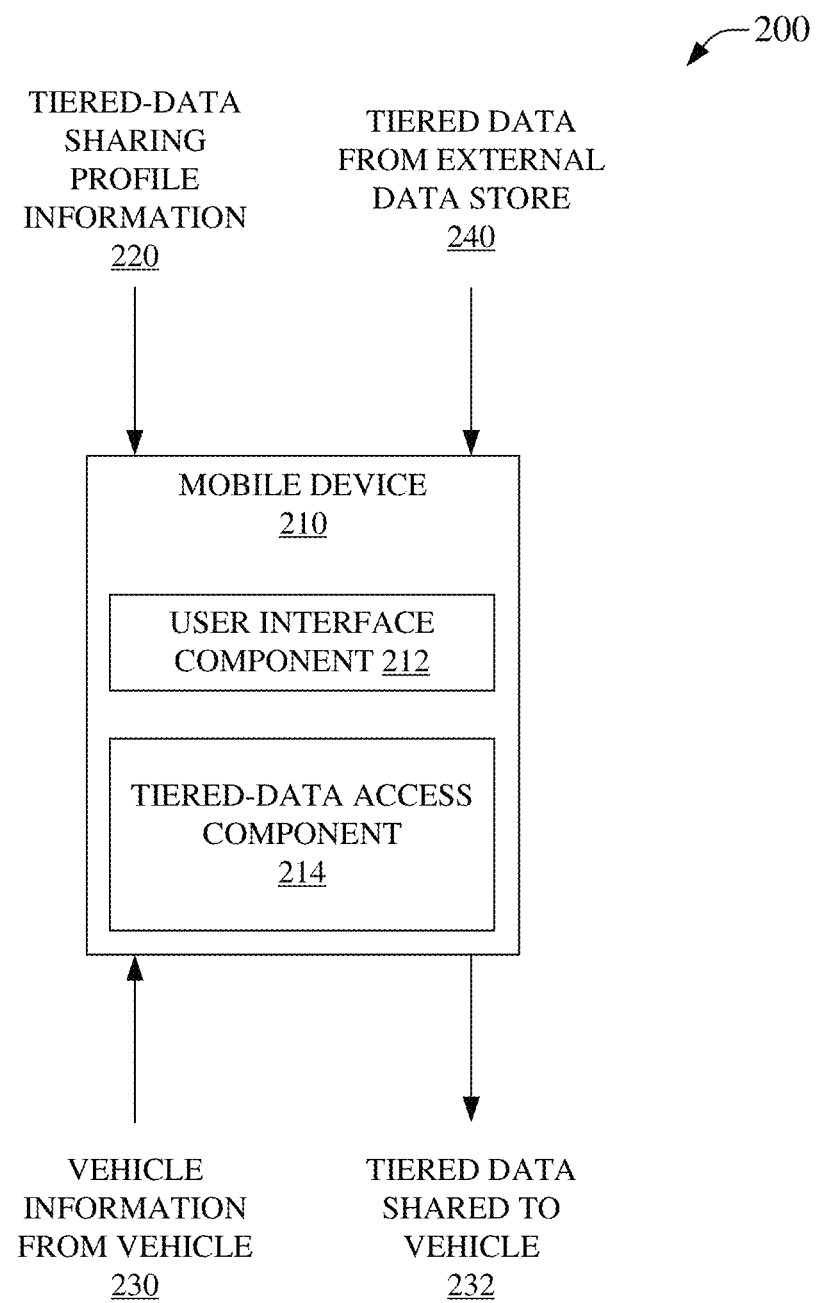
FIG. 2 is a depiction of a system that facilitates employing a mobile device, receiving external tiered data, enabling tiered data exchange for vehicle adaptation in accordance with aspects of the subject disclosure.

FIG. 2 is a depiction of a system 200 that can facilitate employing a mobile device, receiving external tiered data, enabling tiered data exchange for vehicle adaptation in accordance with aspects of the subject disclosure. System 200 can include mobile device 210. Mobile device 210 can comprise UI component 212 and tiered-data access component 214. UI component 212 can receive an indication from a user of mobile device 210. The indication can be related to sharing tiered data with a vehicle, e.g., a vehicle information sharing device (not illustrated) of the vehicle. UI component 212 can be employed to implement authorization or approval related to sharing tiered data with a vehicle. Further, UI component 212 can be employed to directly input tiered data into mobile device 210. This can populate a tiered-data sharing profile. The profile can be stored on the device or external to the device, e.g., on a server by uploading the tiered data input and/or profile to the server. A tiered-data sharing profile can also be created external to the mobile device and can be received by the device as tiered-data sharing profile information 220.

A tiered-data sharing profile can comprise data to be shared, the data associated with a level or tier of sharing associated with security rules, privacy rules, authorization rules, etc. Moreover, tiered-data sharing profile can comprise identifiers associated with data stored in an external store, e.g., account numbers or other account identifiers, account balances, tier rules, etc., such that a tiered data profile can be employed to gather tiered-data from an external store. Tiered data can be stored on an external store and can be received by mobile device 210 as tiered-data from external data store 240. As an example, a tiered-data sharing profile can identify a bridge toll pass account residing on a server operated by a bridge authority, such that, tiered-data sharing profile information 220, comprising information related to the bridge toll pass account from the tiered-data sharing profile, can facilitate a query of the bridge authority server to retrieve the account information, e.g., tiered-data from external data store 240. In an embodiment, tiered-data sharing profile information 220 can comprise tiered-data from external data store 240, e.g., tiered-data from external data store 240 can be employed to prepopulate a tiered-data sharing profile with account information such that tiered-data sharing profile information 220 includes the account information.

Vehicle information from vehicle 230 can be received by mobile device 210. Vehicle information from vehicle 230 can be received via a wired or wireless link between the vehicle and mobile device 210. Vehicle information from vehicle 230 can comprise identification information, parameter information, subsystems information, vehicle information sharing device information, etc. Vehicle information from vehicle 230 can enable mobile device 210 to associate a vehicle with tiered-data sharing profile information 220. Vehicle information from vehicle 230 can be used to request authentication of the vehicle from a user associated with a tiered-data sharing profile, such as by presenting information about the vehicle to the user via UI component 212 and requesting that the user approve associating the vehicle, e.g., vehicle information sharing device, with the tiered-data sharing profile of the user.

Tiered-data access component 214 can determine access to tiered data. Access to tiered data can be based on tiered-data sharing profile information 220, vehicle information from vehicle 230, or tiered-data from external data store 240. Tiered-data access component 214 can apply rules stored on mobile device 210 or received in tiered-data sharing profile information 220 to sharing tiered data. Further, tiered-data access component 214 can share data based on information relating the vehicle information sharing device, such as, supported sharing formats (e.g., RF, images, audio, etc.), vehicle location (e.g., geofencing), or the status of a vehicle association with a tiered-data sharing profile, etc. Moreover, tiered-data access component 214 can determine access to tiered data based on the tiered data, such as, requesting or generating a token for data in a tier associated with not directly sharing the data, accessing an appropriate tiered-data format, etc.

In an aspect, tiered-data access component 214 can convert tiered data between formats to allow tiered-data from external data store 240, or tiered data stored on mobile device 210, to be converted from a first format into a second format germane to a requesting internal or external service device. Conversion of data formats can also depend on the capabilities of a vehicle information sharing device, wherein information on these capabilities can be included in-vehicle information from vehicle 230. As an example, where account data for a toll pass is requested in QR format by a toll booth device, tiered-data access component 214 can convert a barcode version of the account data (e.g., bar code version stored on mobile device 210) or can covert a numerical representation (e.g., numerical representation of account data received in tiered-data from external data store 240) into a QR format for sharing with the vehicle information sharing device (e.g., tiered-data shared to vehicle 232 comprises QR version information). In an aspect, where the vehicle information from vehicle 230 comprises information indicating that the vehicle information sharing device is unable to display a QR code, tiered-data access component 214 can negotiate an alternative format with the toll booth device or can initiate a relevant message to the user via UI component 212.

Mobile device 210 can enable access to tiered-data shared to vehicle 232. Mobile device 210 can share information to the vehicle, e.g., tiered-data shared to vehicle 232, based on tiered-data sharing profile information 220, vehicle information from vehicle 230, and tiered-data from external data store 240. Information shared with the vehicle, e.g., with a vehicle information sharing device, can enable the vehicle to share this information with internal or external service devices (not illustrated). As an example, tiered-data shared to vehicle 232 can enable a vehicle information sharing device to share a toll pass bar code by generating an image of the bar code on a display that can be read by a toll booth device. It is to be noted that nearly any service can be interacted with by a vehicle information sharing device to allow tiered-data sharing via mobile device 210 without departing from the scope of the subject disclosure and that not all examples are presented herein simply for the sake of clarity and brevity.

Figure 3:
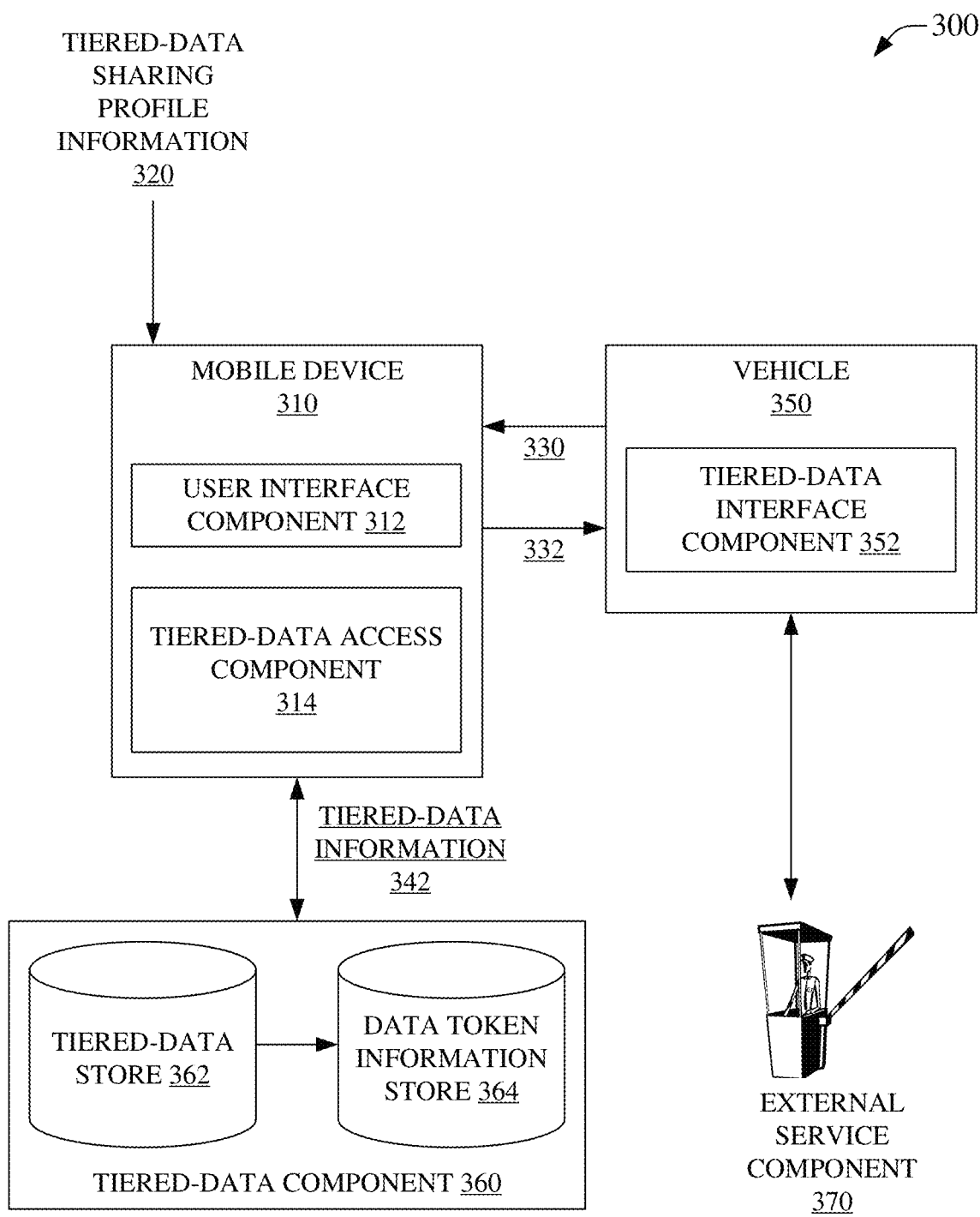
FIG. 3 illustrates a system that facilitates employing a mobile device enabled tiered data exchange for vehicle adaptation and data tokens in accordance with aspects of the subject disclosure.

FIG. 3 illustrates a system 300 that facilitates employing a mobile device enabled tiered data exchange for vehicle adaptation and data tokens in accordance with aspects of the subject disclosure. System 300 can include mobile device 310. Mobile device 310 can comprise UI component 312 and tiered-data access component 314. UI component 312 can receive an indication from a user of mobile device 310. The indication can be related to sharing tiered data with a vehicle, e.g., a vehicle information sharing device (not illustrated) of the vehicle. UI component 312 can be employed to implement authorization or approval related to sharing tiered data with a vehicle. Further, UI component 312 can be employed to directly input tiered data into mobile device 310. This can populate a tiered-data sharing profile. The profile can be stored on the device or external to the device, e.g., on a server by uploading the tiered data input and/or profile to the server. A tiered-data sharing profile can also be created external to the mobile device and can be received by the device as tiered-data sharing profile information 320.

A tiered-data sharing profile can comprise data to be shared, the data associated with a level or tier of sharing associated with security rules, privacy rules, authorization rules, etc. Moreover, tiered-data sharing profile can comprise identifiers associated with data stored in an external store, e.g., account numbers or other account identifiers, account balances, tier rules, etc., such that a tiered data profile can be employed to gather tiered-data from an external store. Tiered data can be stored on an external store, tiered-data store 362 of tiered-data component 360, and can be received by mobile device 310 as part of tiered-data information 342. In an embodiment, tiered-data sharing profile information 320 can comprise tiered-data from tiered-data store 362, e.g., tiered-data from tiered-data store 362 can be employed to prepopulate a tiered-data sharing profile with account information such that tiered-data sharing profile information 320 includes the account information.

Tiered-data information 342 can also comprise information relevant to receiving stored tiered data from tiered-data component 360, e.g., from tiered-data store 362. This can include requests for tiered data generated by mobile device 310 and communicated to tiered-data component 360 as part of tiered-data information 342. Further, tiered-data information 342 can comprise information relevant to receiving representations of stored tiered data that shield the tiered data, e.g., a token. Token information can be stored on token information store 364 of tiered-data component 360. Token information can include token identifiers and corresponding tiered data, for example, a first token can be identified as 'token 1234' and can be associated with bank 'account number 987654321' such that when 'token 1234' is redeemed by an internal or external service, that service only has 'token 1234' information but does not have 'account number 987654321' information. The redemption of 'token 1234' can be performed by a trusted partner device (not illustrated) that can charge 'account number 987654321' and credit the service correspondingly without exposing the bank account number to the service. As such, tiered-data component 360, in an embodiment, can communicate with a trusted partner device to facilitate processing of tokens. This communication can be by way of mobile device 310, such as, using a Wi-Fi connection of mobile device 310 to communicate token information from tiered-data component 360 to a trusted partner device.

Vehicle information from vehicle 330 can be received by mobile device 310. Vehicle information from vehicle 330 can be received via a wired or wireless link between the vehicle and mobile device 310. Vehicle information from vehicle 330 can comprise identification information, parameter information, subsystems information, vehicle information sharing device information, etc. Vehicle information from vehicle 330 can enable mobile device 310 to associate a vehicle with tiered-data sharing profile information 320. Vehicle information from vehicle 330 can be used to request authentication of the vehicle from a user associated with a tiered-data sharing profile, such as by presenting information about the vehicle to the user via UI component 312 and requesting that the user approve associating the vehicle, e.g., vehicle information sharing device, with the tiered-data sharing profile of the user.

Tiered-data access component 314 can determine access to tiered data. Access to tiered data can be based on tiered-data sharing profile information 320, vehicle information from vehicle 330, or tiered-data information 342. Tiered-data access component 314 can apply rules stored on mobile device 310, or received in tiered-data sharing profile information 320, to sharing tiered data. Further, tiered-data access component 314 can share tiered data based on information relating the vehicle information sharing device, such as, supported sharing formats, vehicle location, or the status of a vehicle association with a tiered-data sharing profile, etc. Moreover, tiered-data access component 314 can determine access to tiered data based on the tiered data, such as, requesting or generating a token for data in a tier associated with not directly sharing the data, accessing an appropriate tiered-data format, etc. In an aspect, tiered-data access component 314 can convert tiered data between formats to allow tiered-data from tiered-data store 362, or tiered data stored on mobile device 310, to be converted from a first format into a second format germane to a requesting internal or external service device.

Mobile device 310 can enable access to tiered-data shared to vehicle 332. Mobile device 310 can share information to the vehicle, e.g., tiered-data shared to vehicle 332, based on tiered-data sharing profile information 320, vehicle information from vehicle 330, and tiered-data information 342. Information shared with the vehicle, e.g., with a vehicle information sharing device, can enable the vehicle to share this information with internal or external service devices (not illustrated) via tiered data interface component 352. As an example, tiered-data shared to vehicle 332 can enable a vehicle information sharing device to share a toll pass bar code by generating an image of the bar code on a display linked to tiered data interface component 352, such that, the bar code can be read by a toll booth device. Further, tiered data interface component 352 can be linked to various vehicle subsystems to facilitate communication of tiered-data shared to vehicle 332. As an example, tiered data interface component 352 can be linked to a vehicle BLUETOOTH transponder to enable sharing of tiered-data shared to vehicle 332 by BLUETOOTH with external service component 370. As another example, tiered data interface component 352 can be linked to a vehicle brake light system to enable sharing of tiered-data shared to vehicle 332 by pulsing the brake lights. This can share vehicle operator information with a police vehicle parked to the rear of the vehicle, e.g., the police vehicle can have an external service component 370 that queries the restrained vehicle and reads the pulsing brake lights to seek access to license and registration information associated with a tiered-data sharing profile for a mobile device in the restrained vehicle. It is to be noted that nearly any service can be interacted with by a vehicle information sharing device to allow tiered-data sharing via mobile device 310 without departing from the scope of the subject disclosure and that not all examples are presented herein simply for the sake of clarity and brevity.

Figure 4:
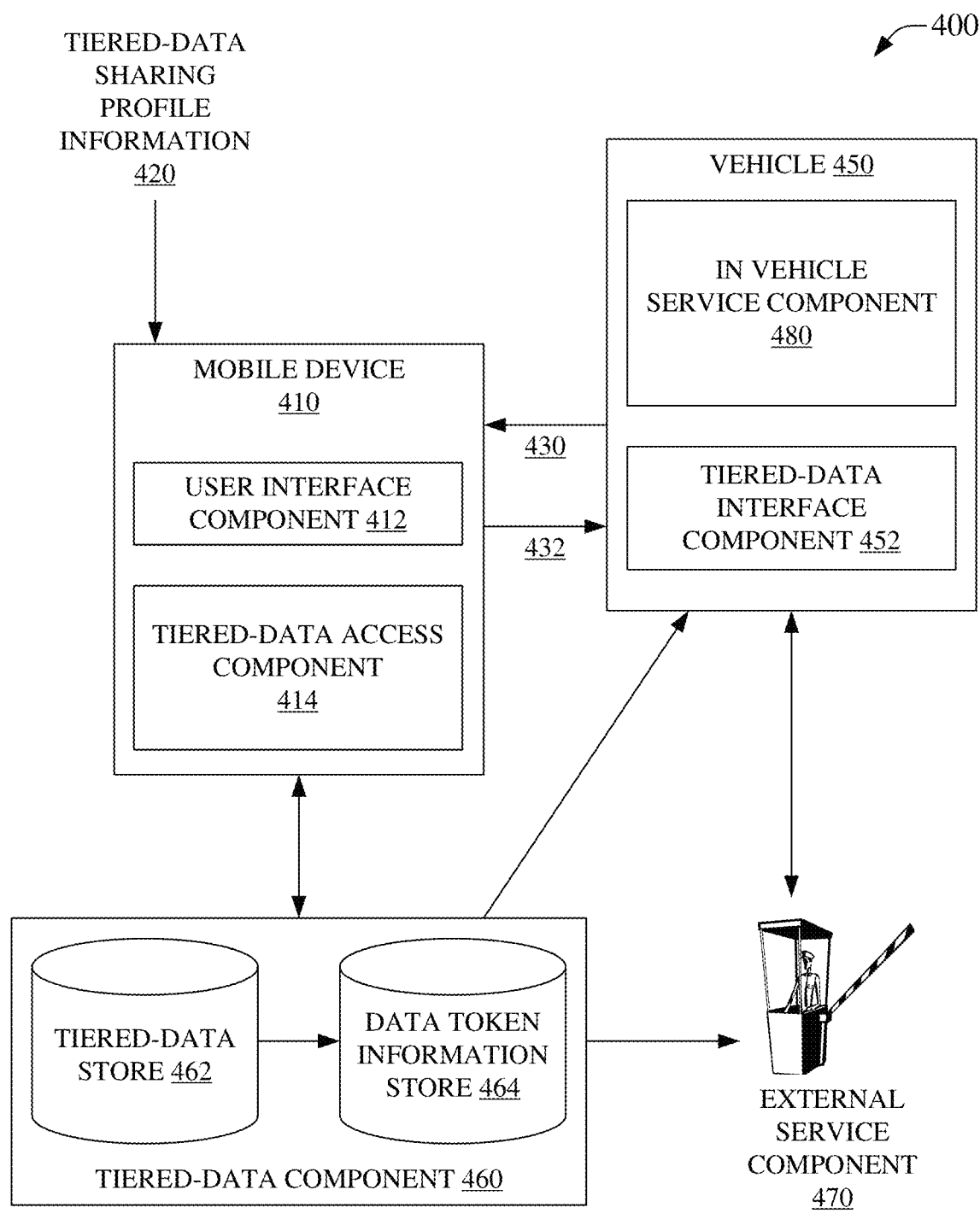
FIG. 4 illustrates a system that facilitates employing a mobile device enabled tiered data exchange for vehicle adaptation and communication of a data token from a token store device to an external service device in accordance with aspects of the subject disclosure.

FIG. 4 illustrates a system 400 that facilitates employing a mobile device enabled tiered data exchange for vehicle adaptation and communication of a data token from a token store device to an external service device in accordance with aspects of the subject disclosure. System 400 can include mobile device 410. Mobile device 410 can comprise UI component 412 and tiered-data access component 414. UI component 412 can receive an indication from a user of mobile device 410. The indication can be related to sharing tiered data with a vehicle, e.g., a vehicle information sharing device (not illustrated) of the vehicle. UI component 412 can be employed to implement authorization or approval related to sharing tiered data with a vehicle. Further, UI component 412 can be employed to directly input tiered data into mobile device 410. This can populate a tiered-data sharing profile. The profile can be stored on the device or external to the device, e.g., on a server by uploading the tiered data input and/or profile to the server. A tiered-data sharing profile can also be created external to the mobile device and can be received by the device as tiered-data sharing profile information 420.

A tiered-data sharing profile can comprise data to be shared, the data associated with a level or tier of sharing associated with security rules, privacy rules, authorization rules, etc. Moreover, tiered-data sharing profile can comprise identifiers associated with data stored in an external store, e.g., account numbers or other account identifiers, account balances, tier rules, etc., such that a tiered data profile can be employed to gather tiered-data from an external store. Tiered data can be stored on an external store, tiered-data store 462 of tiered-data component 460, and can be received by mobile device 410. In an embodiment, tiered-data sharing profile information 420 can comprise tiered-data from tiered-data store 462, e.g., tiered-data from tiered-data store 462 can be employed to prepopulate a tiered-data sharing profile with account information such that tiered-data sharing profile information 420 includes the account information.

Mobile device 410 can also receive information relevant to receiving representations of stored tiered data that shield the tiered data, e.g., a token. Token information can be stored on token information store 464 of tiered-data component 460. Token information can include token identifiers and corresponding tiered data. Tiered-data component 460, in an embodiment, can communicate with a trusted partner device to facilitate processing of tokens. This communication can be by way of mobile device 410.

Vehicle information from vehicle 430 can be received by mobile device 410. Vehicle information from vehicle 430 can be received via a wired or wireless link between the vehicle and mobile device 410. Vehicle information from vehicle 430 can comprise identification information, parameter information, subsystems information, vehicle information sharing device information, etc. Vehicle information from vehicle 430 can enable mobile device 410 to associate a vehicle with tiered-data sharing profile information 420. Vehicle information from vehicle 430 can be used to request authentication of the vehicle from a user associated with a tiered-data sharing profile, such as by presenting information about the vehicle to the user via UI component 412 and requesting that the user approve associating the vehicle, e.g., vehicle information sharing device, with the tiered-data sharing profile of the user.

Tiered-data access component 414 can determine access to tiered data. Access to tiered data can be based on tiered-data sharing profile information 420, vehicle information from vehicle 430, or tiered-data information 442. Tiered-data access component 414 can apply rules stored on mobile device 410, or received in tiered-data sharing profile information 420, to sharing tiered data. Further, tiered-data access component 414 can share tiered data based on information relating the vehicle information sharing device, such as, supported sharing formats, vehicle location, or the status of a vehicle association with a tiered-data sharing profile, etc. Moreover, tiered-data access component 414 can determine access to tiered data based on the tiered data, such as, requesting or generating a token for data in a tier associated with not directly sharing the data, accessing an appropriate tiered-data format, etc. In an aspect, tiered-data access component 414 can convert tiered data between formats to allow tiered-data from tiered-data store 462, or tiered data stored on mobile device 410, to be converted from a first format into a second format germane to a requesting internal or external service device.

Mobile device 410 can enable access to tiered-data shared to vehicle 432. Mobile device 410 can share information to the vehicle, e.g., tiered-data shared to vehicle 432, based on tiered-data sharing profile information 420, vehicle information from vehicle 430, and tiered-data information 442. Information shared with the vehicle, e.g., with a vehicle information sharing device, can enable the vehicle to share this information with internal or external service devices (not illustrated) via tiered data interface component 452. Further, tiered data interface component 452 can be linked to various vehicle subsystems to facilitate communication of tiered-data shared to vehicle 432. It is to be noted that nearly any service can be interacted with by a vehicle information sharing device to allow tiered-data sharing via mobile device 410 without departing from the scope of the subject disclosure and that not all examples are presented herein simply for the sake of clarity and brevity.

Further, tiered-data access component 414 can enable access to tiered-data or tokens via tiered-data component 460. In some instances, such as where a vehicle information sharing device is incompatible with external service component 470, tiered data or tokens can be shared from tiered-data component 460 with external service component 470 directly, bypassing the vehicle information sharing device. In other instances, such as where a mobile device runs out of power before it can communicate tiered-data to the vehicle, tiered-data component 460 can communicate the tiered data to the vehicle directly, where the vehicle has communications capabilities.

Vehicle 450 can further comprise in-vehicle service component 480. In-vehicle service component 480 can allow for sharing tiered-data with services associated with the vehicle itself. This can be very useful in vehicles that are not owned by a user insomuch as vehicles owned by others can often lack customizations that could be associated with a user owned vehicle. As an example, a user may have satellite radio in their personal vehicle but satellite radio may be a premium option in a shared vehicle or a rental vehicle. In-vehicle service component 480 can allow tiered data, such as a user subscription to satellite radio, to be communicated to the vehicle to allow that option to function in the vehicle. As an example, a user with a satellite radio subscription could have access both in their personal vehicle and in a rental vehicle in another city simply by allowing the mobile device to share the subscription account data with the rental vehicle. Similarly, where the user does not have a satellite radio subscription, they can use a bank account linked to their tiered-data sharing profile to purchase a subscription in the vehicle by way of the in-vehicle service component 480 in a manner as described elsewhere herein with regard to purchasing services from an external service component 470.

Figure 5:
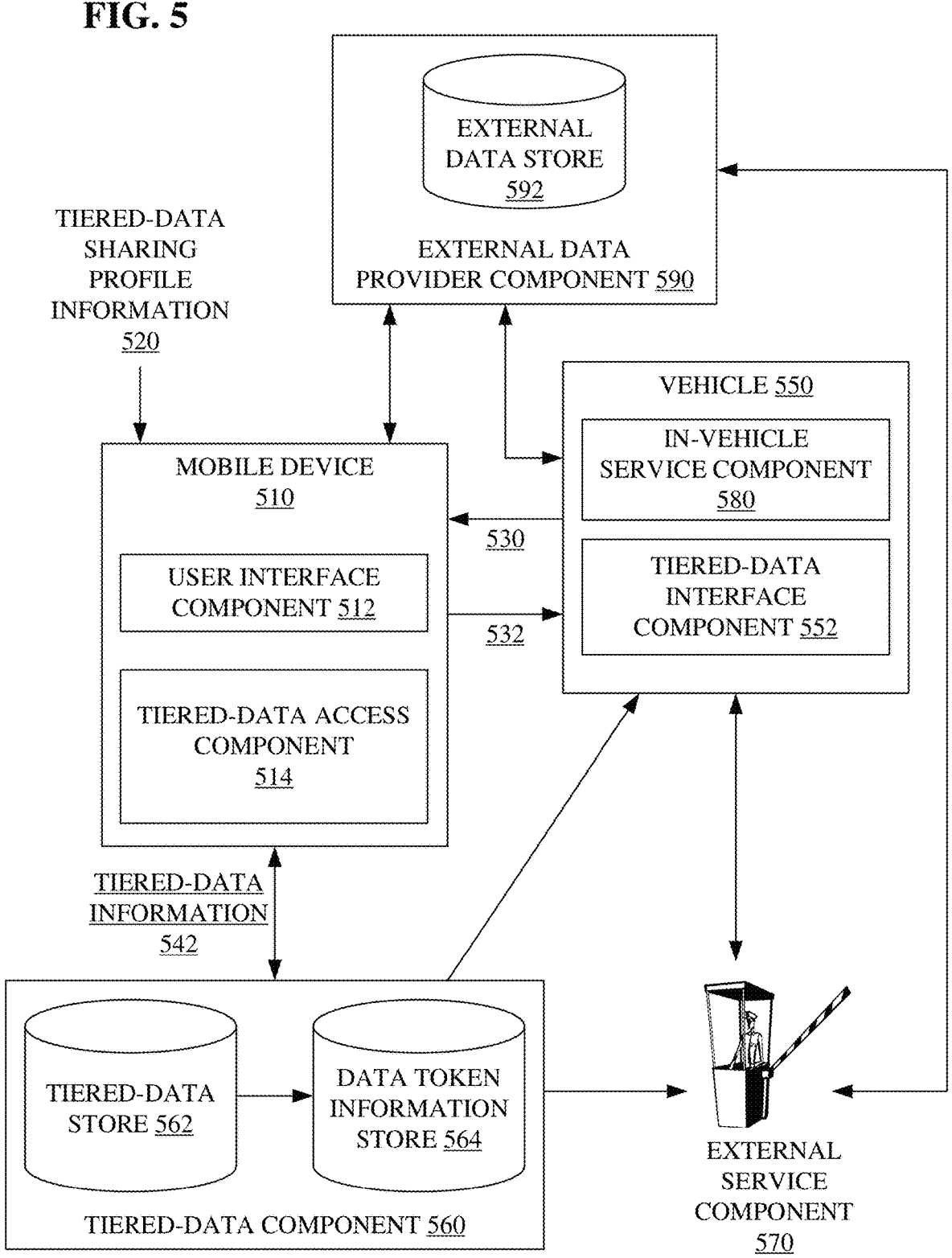
FIG. 5 illustrates a system that employs a mobile device enabled tiered-data exchange for vehicle adaptation and an external data provider in accordance with aspects of the subject disclosure.

FIG. 5 illustrates exemplary system 500 that employs a mobile device enabled tiered data exchange for vehicle adaptation and an external data provider in accordance with aspects of the subject disclosure. System 500 can include mobile device 510. Mobile device 510 can comprise UI component 512 and tiered-data access component 514. UI component 512 can receive an indication from a user of mobile device 510. The indication can be related to sharing tiered data with a vehicle, e.g., a vehicle information sharing device (not illustrated) of the vehicle. UI component 512 can be employed to implement authorization or approval related to sharing tiered data with a vehicle. Further, UI component 512 can be employed to directly input tiered data into mobile device 510. This can populate a tiered-data sharing profile. The profile can be stored on the device or external to the device, e.g., on a server by uploading the tiered data input and/or profile to the server. A tiered-data sharing profile can also be created external to the mobile device and can be received by the device as tiered-data sharing profile information 520.

A tiered-data sharing profile can comprise data to be shared, the data associated with a level or tier of sharing related to security rules, privacy rules, authorization rules, etc. Moreover, a tiered-data sharing profile can comprise identifiers associated with data stored in an external store, e.g., account numbers or other account identifiers, account balances, tier rules, etc., such that a tiered data profile can be employed to gather tiered-data from an external store. Tiered data can be stored on an external store, tiered-data store 562 of tiered-data component 560, and can be received by mobile device 510. In an embodiment, tiered-data sharing profile information 520 can comprise tiered-data from tiered-data store 562, e.g., tiered-data from tiered-data store 562 can be employed to prepopulate a tiered-data sharing profile with account information such that tiered-data sharing profile information 520 includes the account information.

Mobile device 510 can also receive information relevant to receiving representations of stored tiered data that shield the tiered data, e.g., a token. Token information can be stored on token information store 564 of tiered-data component

560. Token information can include token identifiers and corresponding tiered data. Tiered-data component 560, in an embodiment, can communicate with a trusted partner device to facilitate processing of tokens. This communication can be by way of mobile device 510.

Vehicle information from vehicle 530 can be received by mobile device 510. Vehicle information from vehicle 530 can be received via a wired or wireless link between the vehicle and mobile device 510. Vehicle information from vehicle 530 can comprise identification information, parameter information, subsystems information, vehicle information sharing device information, etc. Vehicle information from vehicle 530 can enable mobile device 510 to associate a vehicle with tiered-data sharing profile information 520. Vehicle information from vehicle 530 can be used to request authentication of the vehicle 550 from a user associated with a tiered-data sharing profile, such as by presenting information about the vehicle to the user via UI component 512 and requesting that the user approve associating the vehicle 550, e.g., vehicle information sharing device, with the tiered-data sharing profile of the user.

Tiered-data access component 514 can determine access to tiered data. Access to tiered data can be based on tiered-data sharing profile information 520, vehicle information from vehicle 530, or tiered-data information 542. Tiered-data access component 514 can apply rules stored on mobile device 510, or received in tiered-data sharing profile information 520, to sharing tiered data. Further, tiered-data access component 514 can share tiered data based on information related to the vehicle information sharing device, such as, supported sharing formats, vehicle location, or the status of a vehicle association with a tiered-data sharing profile, etc. Moreover, tiered-data access component 514 can determine access to tiered data based on the tiered data, such as, requesting or generating a token for data in a tier associated with not directly sharing the data, accessing an appropriate tiered-data format, etc. In an aspect, tiered-data access component 514 can convert tiered data between formats to allow tiered-data from tiered-data store 562, or tiered data stored on mobile device 510, to be converted from a first format into a second format germane to a requesting internal or external service device, e.g., external service component 570, in-vehicle service component 580, etc.

Mobile device 510 can enable access to tiered-data shared to vehicle 532. Mobile device 510 can share information to the vehicle 550, e.g., tiered-data shared to vehicle 532, based on tiered-data sharing profile information 520, vehicle information from vehicle 530, and tiered-data information 542. Information shared with vehicle 550, e.g., with a vehicle information sharing device, can enable vehicle 550 to share this information with internal or external service devices (not illustrated) via tiered data interface component 552. Further, tiered data interface component 552 can be linked to various vehicle subsystems to facilitate communication of tiered-data shared to vehicle 532. It is to be noted that nearly any service can be interacted with by a vehicle information sharing device to allow tiered-data sharing via mobile device 510 without departing from the scope of the subject disclosure and that not all examples are presented herein simply for the sake of clarity and brevity.

Further, tiered-data access component 514 can enable access to tiered-data or tokens via tiered-data component 560. In some instances, tiered data or tokens can be shared from tiered-data component 560 with external service component 570 directly, bypassing the vehicle information sharing device. In other instances, tiered-data component 560 can communicate the tiered data to the vehicle directly, where the vehicle has communications capabilities.

Vehicle 550 can further comprise in-vehicle service component 580. In-vehicle service component 580 can allow sharing of tiered-data with services associated with the vehicle itself. In-vehicle service component 580 can allow tiered data to be communicated to vehicle 550 to allow adaptation of vehicle 550. As an example, a user with a trailhead permit could have access to the trailhead permit in both their personal vehicle and a friend's vehicle by allowing the user's mobile device to share the trailhead permit data with different vehicles. Also, where the user does not have a trailhead permit, they can use a payment account linked to their tiered-data sharing profile to purchase the trailhead permit for a vehicle by way of the in-vehicle service component 580 in a manner similar to that described elsewhere herein with regard to purchasing services from an external service component 570.

System 500 can further comprise external data provider component 590 that can enable access to external data stored on external data store 592 to facilitate adaptation of vehicle 550, such as by adapting a vehicle information sharing device. External data provider component 590 can be communicatively coupled to mobile device 510. In other embodiments, external data provider component 590 can be communicatively coupled to vehicle 550 or external service component 570. External data provider component 590 can source or provide access to data related to tiered data or tiered-data information. In an aspect, this can include content related to an account, service, profile, etc. As an example, a streaming music service can source music content via external data provider component 590 based on tiered-data sharing profile information 520 received by mobile device 510. In another example, tiered-data access component 514 can enable access to a token to purchase a car wash, and external data provider component 590 can provide supplementary information related to the type of car wash to be provided, such as designating wash only, wash and wax only, wash and wax and undercarriage cleaning only, etc. As a further example, where mobile device 510 provides vehicle 550 with a token for a 'quicklube' type vehicle service, external data provider component 590 can provide information related to the type and weight of the motor oil to be used on the vehicle, a preferred brand of air filter, etc. External data can be associated with tiered-data sharing profile information 520 or with vehicle information from vehicle 530. This can enable, for example, a user to take a shared vehicle in for services subject to vehicle owner parameters provided via external data from external data provider component 590, e.g., the user can pay for a vehicle service visit while the external data helps ensure that parts approved by the vehicle owner are used in the service. As an example, a shared vehicle operated by ZippyShareCarCompany can be used by Fred. ZippyShareCarCompany can populate an external data store, e.g., 592, with repair information, such as acceptable replacement tires. When Fred takes the vehicle in to replace a blown out tire, Fred's smartphone can provide a token to pay for the new tire and receive external data from external data provider component 590 indicating what replacement tires are acceptable to ZippyShareCarCompany. As such, an acceptable replacement tire can be selected by a repair shop via external service component 570.

In an embodiment, external data provider component 590 can directly source external data to vehicle 550 or external service component 570. Mobile device 510 can provide information to external data component 590 to enable external data provider component 590 to source external data to vehicle 550 or external service component 570. As an example, where Fred is replacing a blown out tire on a car borrowed from ZippyShareCarCompany, mobile device 510 can provide external data provider component 590 with ZippyShareCarCompany information, allowing external data provider component 590 to send acceptable tire information directly to ZippyShareCarCompany rather than passing the tire information through Fred's mobile device. As another example, streaming music data can be directed to vehicle 550, rather than being passed through mobile device 510, based on information received by external data provider component 590 from mobile device 510 in relation to tiered-data sharing profile information 520.

Figure 6:
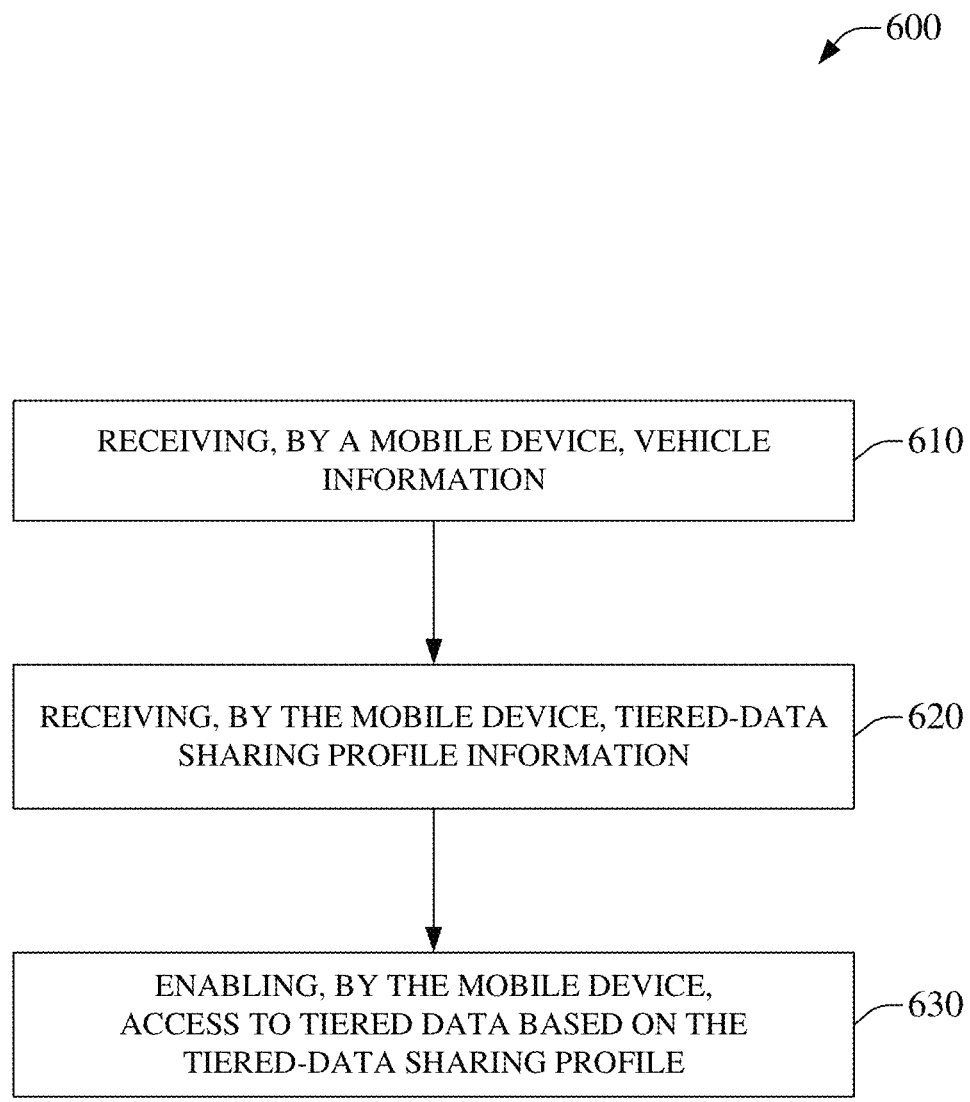
FIG. 6 illustrates a method facilitating employing a mobile device enabled tiered data exchange for vehicle adaptation in accordance with aspects of the subject disclosure.
Figure 7:
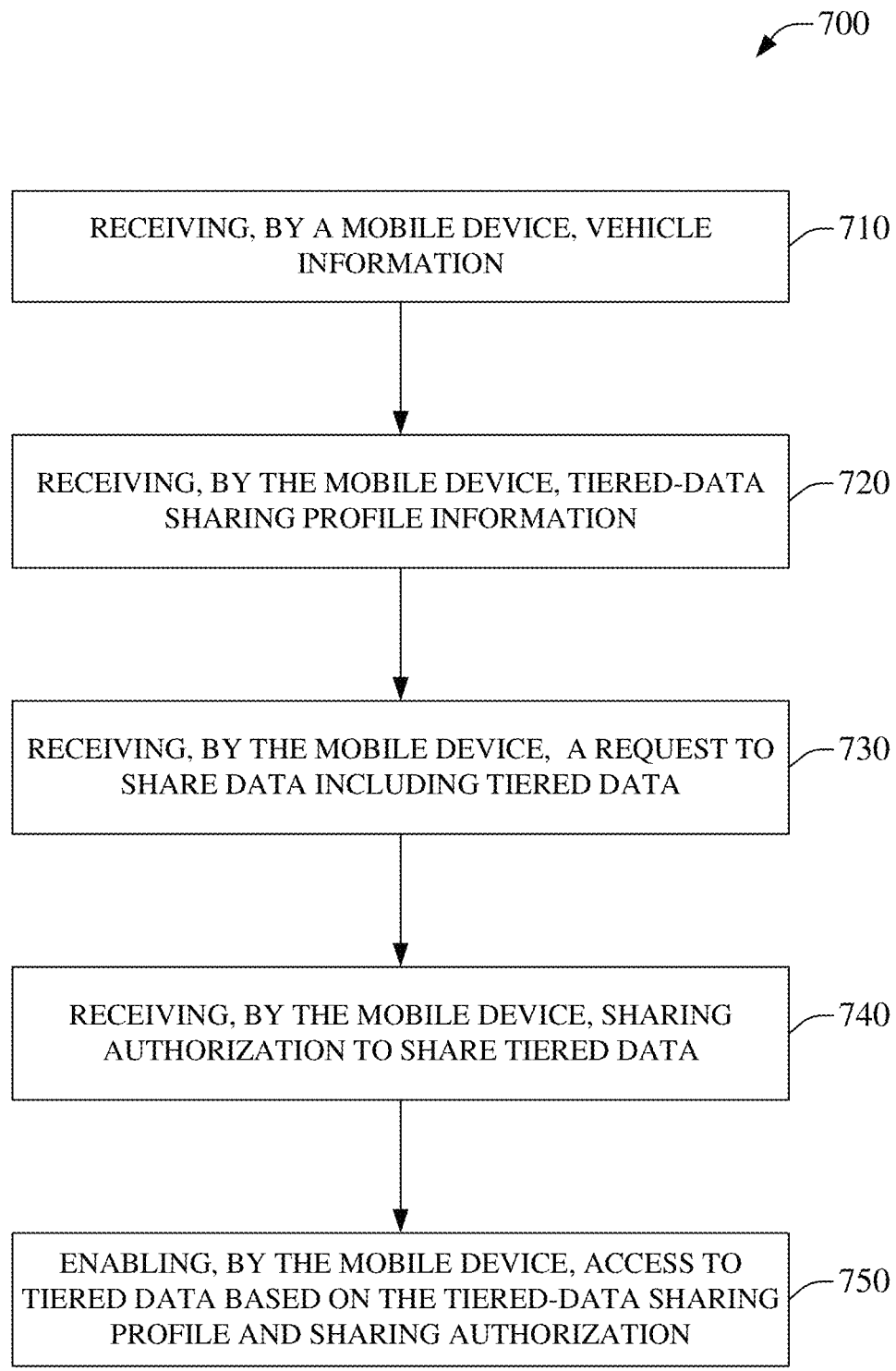
FIG. 7 depicts a method facilitating employing a mobile device enabled tiered data exchange for vehicle adaptation comprising authorization via the mobile device in accordance with aspects of the subject disclosure.
Figure 8:
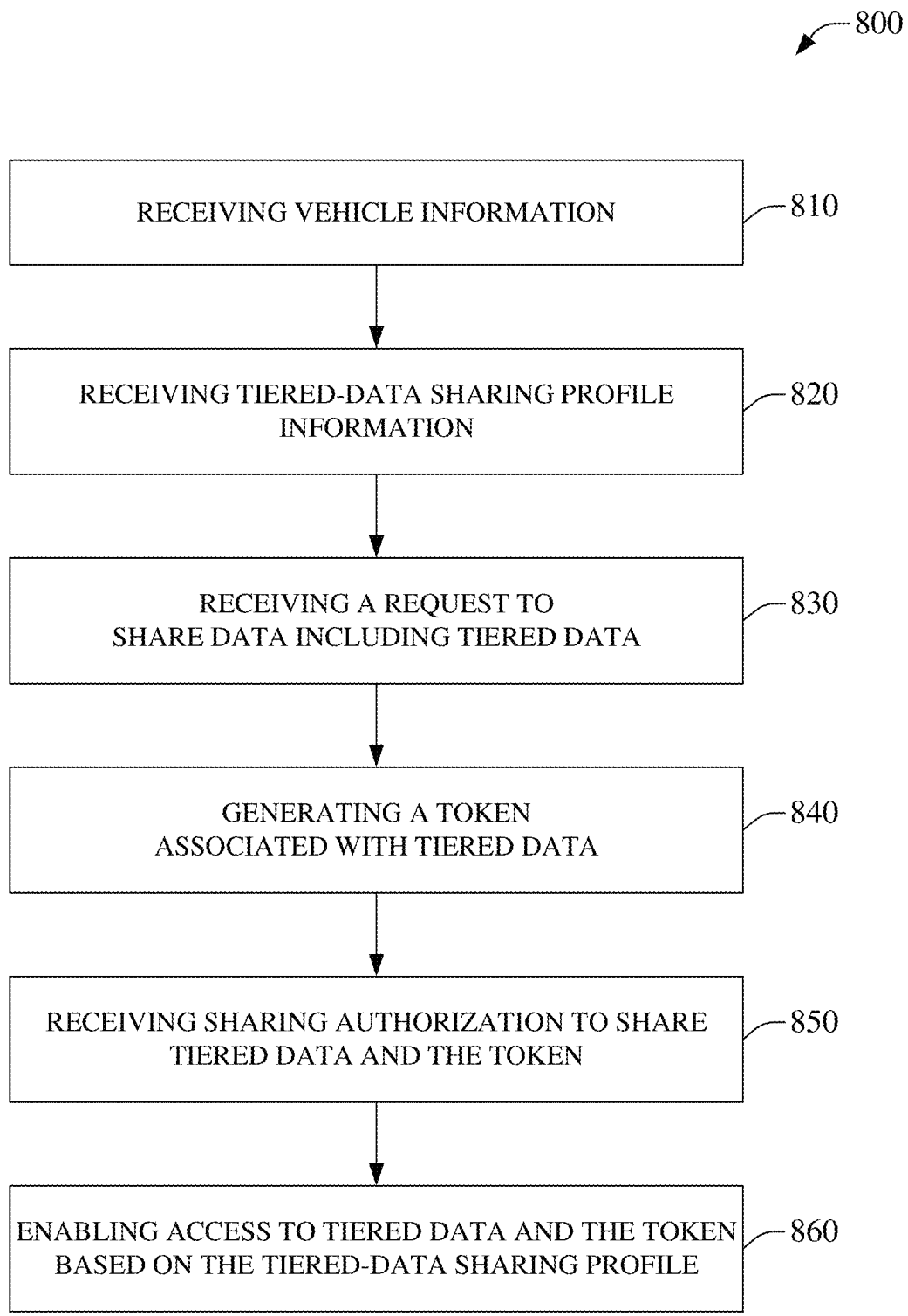
FIG. 8 illustrates a method facilitating employing a mobile device enabled tiered data exchange for vehicle adaptation and data tokens in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 illustrates aspects of method 600 facilitating employing a mobile device enabled tiered data exchange for vehicle adaptation in accordance with aspects of the subject disclosure. At 610, method 600 can include receiving vehicle information by a mobile device. A mobile device can be a smartphone, tablet computer, laptop computer, or any other type of mobile device. Vehicle information can be received by the mobile device through a wired or wireless link. Vehicle information can comprise identification information, parameter information, subsystems information, vehicle information sharing device information, etc. Vehicle information can enable the mobile device to associate the vehicle with tiered-data sharing profile information. A tiered-data sharing profile can comprise data to be shared, wherein the data can be associated with a level or tier of sharing associated with security rules, privacy rules, authorization rules, etc. In an embodiment, vehicle information can be from a vehicle in close proximity to the mobile device, e.g., where the mobile device is within the vehicle. Vehicle information can be used to request authentication of the vehicle from a user associated with a tiered-data sharing profile, such as by presenting information about the vehicle to a user via a user interface component and requesting that the user approve associating the vehicle with tiered-data sharing profile information, e.g., associating a vehicle information sharing device with a tiered-data sharing profile of the user.

In an embodiment, an association of a vehicle with tiered-data sharing profile information can persist such that a user does not need to approve a vehicle each time they are near it. In another embodiment, the association can be non-persistent, such that the user is always asked to authorize a vehicle. Further embodiments can include association persistence rules. These rules can, for example, persist some vehicle associations and not others, can persist a vehicle association for a determined time, persist a vehicle association so long as a determined number of new associations have not been created, etc.

At 620, method 600 can include the mobile device receiving tiered-data sharing profile information. Tiers of tiered data can be associated with corresponding levels of security, privacy, and authorizations, locations, areas, times, rules, etc. Tiered-data sharing profile information can be information relating to a tiered-data sharing profile. A tiered-data sharing profile can be located on the mobile device or can be located external to the mobile device, e.g., on a server or external storage device. In an embodiment, a user interface of the mobile device can be used to create, delete, or modify a tiered-data sharing profile. In another embodiment, a tiered-data sharing profile can be created, deleted, or modified on a device other than the mobile device, e.g., on a personal computer, tablet computer, server, etc. As an example of different data tiers, a first tier can be associated with sharing of the data itself based on association of the tiered-data sharing profile with a vehicle, a second tier can be associated with sharing of the data itself based on association of the tiered-data sharing profile with a vehicle and a further authorization by the associated user, and a third tier can be associated with sharing of a representation of the data without sharing the data itself, e.g., a token of the data, association of the tiered-data sharing profile with a vehicle and a further authorization by the associated user. It will be noted that any number of tiers can be employed without departing from the scope of the disclosed subject matter. Similarly, it will be noted that nearly any combination of security features, privacy features, authorization techniques, etc., can be employed in enabling access to data associated with a tier without departing from the scope of the instant application.

At 630, method 600 can comprise the mobile device enabling access to tiered-data based on the tiered-data sharing profile. At this point, method 600 can end. Information shared with the vehicle, such as, enabling access to tiered data by a vehicle information sharing device of a vehicle, can enable the vehicle to further share this information with internal or external service devices. As an example, tiered-data shared to the vehicle can enable a vehicle information sharing device to share a toll pass code by generating an image of the code on a display that can be read by a toll booth device. As another example, tiered-data shared to the vehicle can enable a vehicle information sharing device to share a parking pass infrared signal with a parking garage infrared receiver. As a further example, tiered-data shared to the vehicle can enable a vehicle information sharing device to share a token, subject to authorization via a user interface component of the mobile device or vehicle, to purchase a subscription to a satellite radio service.

It will be noted that nearly any service can be interacted with by a vehicle information sharing device to allow tiered-data sharing via the mobile device without departing from the scope of the subject disclosure and that not all examples are presented herein simply for the sake of clarity and brevity. Moreover, nearly any vehicle subsystem can be subject to adaptation or control based on information related to shared tiered data. As an example, headlights can be adapted to flash codes, a stereo system can be adapted to play an audio code, a vehicle BLUETOOTH transceiver can be adapted to transmit a signal, etc. Further, as stated herein, a vehicle information sharing device can share information with an internal or external service by way of RF, images, modulated light, audio tones, etc. With this in mind, it will be noted that a vehicle can employ more than one subsystem to share information, e.g., flashing headlights, audio tones on the stereo, and RF codes from a BLUETOOTH adapter, to share information with one or more internal or external services based on information related to a tiered-data sharing profile.

FIG. 7 illustrates a method 700 that facilitates employing a mobile device enabled tiered data exchange for vehicle adaptation comprising authorization via the mobile device in accordance with aspects of the subject disclosure. At 710, method 700 can include receiving vehicle information by a mobile device. A mobile device can be a smartphone, tablet computer, laptop computer, or any other type of mobile device. Vehicle information can be received by the mobile device through a wired or wireless link. Vehicle information can comprise identification information, parameter information, subsystems information, vehicle information sharing device information, etc. Vehicle information can enable the mobile device to associate the vehicle with tiered-data sharing profile information. A tiered-data sharing profile can comprise data to be shared, wherein the data can be associated with a level or tier of sharing associated with security rules, privacy rules, authorization rules, etc. In an embodiment, vehicle information can be from a vehicle in close proximity to the mobile device, e.g., where the mobile device is within the vehicle. Vehicle information can be used to request authentication of the vehicle from a user associated with a tiered-data sharing profile, such as by presenting information about the vehicle to a user via a user interface component and requesting that the user approve associating the vehicle with tiered-data sharing profile information, e.g., associating a vehicle information sharing device with a tiered-data sharing profile of the user.

In an embodiment, an association of a vehicle with tiered-data sharing profile information can persist such that a user does not need to approve a vehicle each time they are near it. In another embodiment, the association can be non-persistent, such that the user is regularly asked to authorize a vehicle. Further embodiments can include association persistence rules. These rules, for example, can persist some vehicle associations and not others, can persist a vehicle association for a determined time, persist a vehicle association so long as a determined number of new associations have not been created, etc.

At 720, method 700 can include the mobile device receiving tiered-data sharing profile information. Tiers of tiered data can be associated with corresponding levels of security, privacy, and authorizations, locations, areas, times, rules, etc. Tiered-data sharing profile information can be information relating to a tiered-data sharing profile. A tiered-data sharing profile can be located on the mobile device or can be located external to the mobile device, e.g., on a server or external storage device. In an embodiment, a user interface of the mobile device can be used to create, delete, or modify a tiered-data sharing profile. In another embodiment, a tiered-data sharing profile can be created, deleted, or modified on a device other than the mobile device, e.g., on a personal computer, tablet computer, server, etc. As an example of different data tiers, a first tier can be associated with sharing of the data itself based on association of the tiered-data sharing profile with a vehicle, a second tier can be associated with sharing of the data itself based on association of the tiered-data sharing profile with a vehicle and a further authorization by the associated user, and a third tier can be associated with sharing of a representation of the data without sharing the data itself, e.g., a token of the data, association of the tiered-data sharing profile with a vehicle and a further authorization by the associated user. It will be noted that any number of tiers can be employed without departing from the scope of the disclosed subject matter. Similarly, it will be noted that nearly any combination of security features, privacy features, authorization techniques, etc., can be employed in enabling access to data associated with a tier without departing from the scope of the instant application.

At 730, method 700 can comprise the mobile device receiving a request to share data including tiered data. In response to receiving the request, the mobile device can initiate sharing tiered-data subject to the constraints of the associated tier parameters, such as, security rules, privacy rules, authorization rules, etc. The sharing can also be subject to vehicle information sharing device parameters, such as, the types of communication supported by the vehicle, etc. In an embodiment, the request to share data can be received via a vehicle associated with a tiered-data sharing profile of the mobile device, such as, a toll booth device can request payment from a vehicle information sharing device which, in turn, can request that toll pass data or payment data be shared from the mobile device based on the tiered-data sharing profile information. In another embodiment, the request to share data can be received by the mobile device from an external service component. As an example, a toll booth device can request payment or toll pass data from the mobile device based on a tiered-data sharing profile information, which can the mobile device to effect sharing the toll pass data or payment data with the toll booth device via the vehicle, e.g., by way of a vehicle sharing information device of the vehicle.

At 740, method 700 can include the mobile device receiving sharing authorization to share tiered data. The mobile device can be employed to implement authorization or approval related to sharing tiered data with a vehicle information sharing device. As an example, a mobile device user interface component can receive a password, fingerprint, voice print, iris scan, etc. as part of authorizing sharing of tiered-data with the vehicle. In an embodiment, the mobile device can receive authorization from an external source, such as a user entering authorization into a vehicle based user interface, such that the authorization is then sent to the mobile device.

At 750, method 700 can comprise the mobile device enabling access to tiered-data based on the tiered-data sharing profile. At this point, method 700 can end. Information shared with the vehicle, such as, enabling access to tiered data by a vehicle information sharing device of a vehicle, can enable the vehicle to further share this information with internal or external service devices. As an example, tiered-data shared to the vehicle can enable a vehicle information sharing device to share a toll pass code by generating an image of the code on a display that can be read by a toll booth device. As another example, tiered-data shared to the vehicle can enable a vehicle information sharing device to share a parking pass infrared signal with a parking garage infrared receiver. As a further example, tiered-data shared to the vehicle can enable a vehicle information sharing device to share a token, subject to authorization via a user interface component of the mobile device or vehicle, to purchase a subscription to a satellite radio service.

It will be noted that nearly any service can be interacted with by a vehicle information sharing device to allow tiered-data sharing via the mobile device without departing from the scope of the subject disclosure and that not all examples are presented herein simply for the sake of clarity and brevity. Moreover, nearly any vehicle subsystem can be subject to adaptation or control based on information related to shared tiered data. As an example, headlights can be adapted to flash codes, a stereo system can be adapted to play an audio code, a vehicle BLUETOOTH transceiver can be adapted to transmit a signal, etc. Further, as stated herein, a vehicle information sharing device can share information with an internal or external service by way of RF, images, modulated light, audio tones, etc. With this in mind, it will be noted that a vehicle can employ more than one subsystem to share information, e.g., flashing headlights, audio tones on the stereo, and RF codes from a BLUETOOTH adapter, to share information with one or more internal or external services based on information related to a tiered-data sharing profile.

FIG. 8 illustrates a method 800 that facilitates employing a mobile device enabled tiered data exchange for vehicle adaptation and data tokens in accordance with aspects of the subject disclosure. At 810, method 800 can include receiving vehicle information. Vehicle information can be received through a wired or wireless link. Vehicle information can comprise identification information, parameter information, subsystems information, vehicle information sharing device information, etc. Vehicle information can enable associating the vehicle with tiered-data sharing profile information. A tiered-data sharing profile can comprise data to be shared, wherein the data can be associated with a level or tier of sharing associated with security rules, privacy rules, authorization rules, etc. In an embodiment, vehicle information can be from a vehicle in close proximity to a mobile device, e.g., where the mobile device is within the vehicle. Vehicle information can be used to request authentication of the vehicle from a mobile device associated with a tiered-data sharing profile, such as by presenting information about the vehicle to a user via a user interface of the mobile device and requesting that the user approve associating the vehicle with tiered-data sharing profile information, e.g., associating a vehicle information sharing device with a tiered-data sharing profile of the user. In an embodiment, an association of a vehicle with tiered-data sharing profile information can persist such that a user does not need to approve a vehicle each time they are near it. In another embodiment, the association can be non-persistent, such that the user is regularly asked to authorize a vehicle. Further embodiments can include association persistence rules.

At 820, method 800 can include receiving tiered-data sharing profile information. Tiers for data can be associated with corresponding levels of security, privacy, authorizations, locations, areas, times, rules, etc. Tiered-data sharing profile information can be information relating to a tiered-data sharing profile. A tiered-data sharing profile can be located on a mobile device or can be located external to a mobile device, e.g., on a server or storage device. In an embodiment, a user interface of a mobile device can be used to create, delete, or modify a tiered-data sharing profile. In another embodiment, a tiered-data sharing profile can be created, deleted, or modified on a device other than a mobile device, e.g., on a personal computer, tablet computer, server, computer workstation, etc. As an example of different data tiers, a first tier can be associated with sharing of the data itself based on association of the tiered-data sharing profile with a vehicle, a second tier can be associated with sharing of the data itself based on association of the tiered-data sharing profile with a vehicle and a further authorization by the associated user, and a third tier can be associated with sharing of a representation of the data without sharing the data itself, e.g., a token of the data, association of the tiered-data sharing profile with a vehicle and a further authorization by the associated user. It will be noted that any number of tiers can be employed without departing from the scope of the disclosed subject matter. Similarly, it will be noted that nearly any combination of security features, privacy features, authorization techniques, etc., can be employed in enabling access to data associated with a tier without departing from the scope of the instant application.

At 830, method 800 can comprise receiving a request to share data including tiered data. In response to receiving the request, sharing tiered-data can be initiated subject to constraints of the associated tier parameters, such as, security rules, privacy rules, authorization rules, etc. The sharing can also be subject to vehicle information sharing device parameters, such as, the types of communication supported by the vehicle, etc. In an embodiment, the request to share data can be received via a vehicle associated with a tiered-data sharing profile. In another embodiment, the request to share data can be received from an external service component.

At 840, method 800 can include the generating a token associated with tiered data to obfuscate tiered data. High sensitivity data can be associated with a data tier employing digital tokens, hereinafter a token, as a form a securing the data itself. As an example, sharing a token of data, rather than the data itself, does not expose the data itself but does allow exchange of the token for reconciliation of a transaction. As such, a vehicle battery charging station, for example, can request a payment in exchange for charging an electric vehicle battery by transmitting a signal to the vehicle. The vehicle can be affiliated with a tiered-data sharing profile indicating payments of this type are in a tier that employs a token rather than exposing actual data, such as, a bank account number, a credit card number, etc. The vehicle can share a token with the battery charging service. The token can be redeemed by a reconciling system of the battery charging service resulting in funds being paid to the charging service and, correspondingly, funds being withdrawn from the bank account or credit card identified in the tiered-data sharing profile. This occurs, though use of a token, without sharing the bank account number or credit card number with the charging service. Tokens can be exchanged, for example, via a reconciliation service provider, with the mobile service provider, with a bank, etc. The tokens can also be associated with rules, such as expiration conditions, time limits, value limits, secondary authorization, etc.

At 850, method 800 can include receiving sharing authorization to share tiered data and the token. A mobile device can be employed to implement authorization or approval related to sharing tiered data and tokens. As an example, a mobile device user interface component can receive a password, fingerprint, voice print, iris scan, etc. as part of authorizing sharing of tiered-data and tokens. In an embodiment, authorization can be received from an external source, such as a user entering authorization into a vehicle based user interface, a user interface of an external service device, etc.

At 860, method 800 can comprise enabling access to tiered-data and token based on the tiered-data sharing profile. At this point, method 800 can end. Information shared with the vehicle, such as, enabling access to tiered data and tokens by a vehicle information sharing device of a vehicle, can enable the vehicle to further share this information with internal or external service devices. As an example, tiered-data shared to the vehicle can enable a vehicle information sharing device to share a token to pay a bridge toll by generating an image representing the token information on a display that can be read by a toll booth device. In an aspect, the token can be represented by a QR code, a bar code, a symbolic code, modulated light, modulated sound pressure, etc. As another example, a token shared to a vehicle can enable a vehicle information sharing device to share the token with a parking garage infrared receiver. As a further example, a token shared to a vehicle can enable a vehicle information sharing device to share the token to effect purchase a subscription to a satellite radio service within the vehicle.

It will be noted that nearly any service can be interacted with by a vehicle information sharing device to allow tiered-data sharing via the mobile device without departing from the scope of the subject disclosure and that not all examples are presented herein simply for the sake of clarity and brevity. Moreover, nearly any vehicle subsystem can be subject to adaptation or control based on information related to shared tiered data. As an example, headlights can be adapted to flash codes, a stereo system can be adapted to play an audio code, a vehicle BLUETOOTH transceiver can be adapted to transmit a signal, etc. Further, as stated herein, a vehicle information sharing device can share information with an internal or external service by way of RF, images, modulated light, audio tones, etc. With this in mind, it will be noted that a vehicle can employ more than one subsystem to share information, e.g., flashing headlights, audio tones on the stereo, and RF codes from a BLUETOOTH adapter, to share information with one or more internal or external services based on information related to a tiered-data sharing profile.

Figure 9:
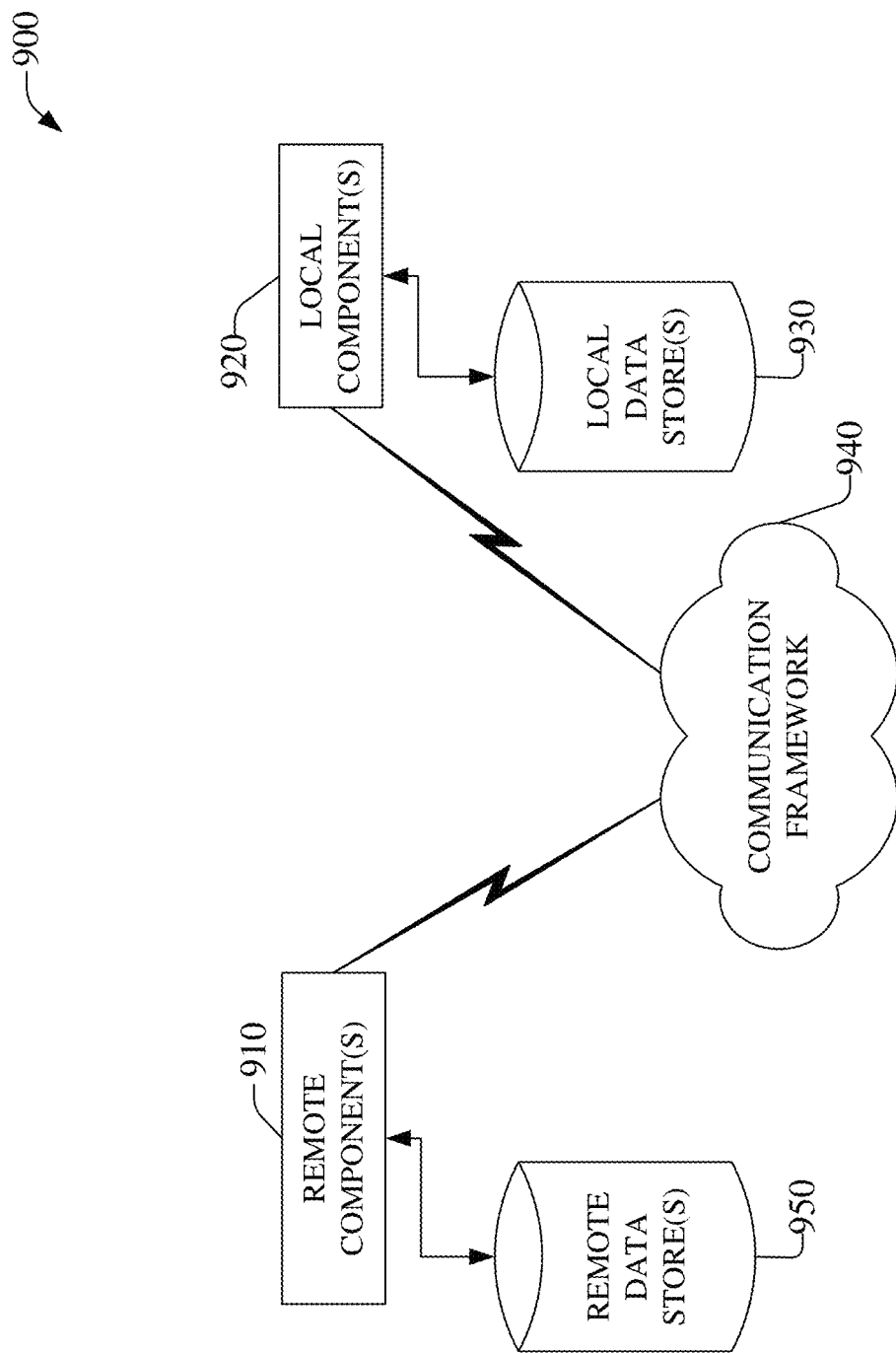
FIG. 9 depicts a schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be a device of a wireless carrier network, e.g., a RAN. As another example, remote component(s) 910 can be a server associated with a cloud computing provider device.

The system 900 also includes one or more local component(s) 920. The local component(s) 920 can be hardware and/or software (e.g., threads, processes, computing devices). In some embodiments, local component(s) 920 can include mobile device 110, 210, 310, 410, 510, etc. As an example, local component(s) 920 can be a smartphone configured to receive tiered-data sharing profile information, e.g., 120, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. As an example, tiered-data sharing profile information, tiered-data, vehicle information, etc., can be communicated over a packet-switched or circuit-switched channels between remote component 910, and a mobile device, e.g., a local component 920, via an air interface, such as on a packet-switched or circuit-switched downlink channel. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as a tiered-data store 562, data token information store 564, external data store 592, etc., that can be employed to store information, such as tiered data, a tiered-data sharing profile, etc., on the remote component(s) 910 side of communication framework 940. Similarly, local component(s) 920 can be operably connected to one or more local data store(s) 930, that can be employed to store information, such as received tiered data, received tiered-data sharing profile information, etc., on the to the local component(s) 920 side of communication framework 940.

Figure 10:
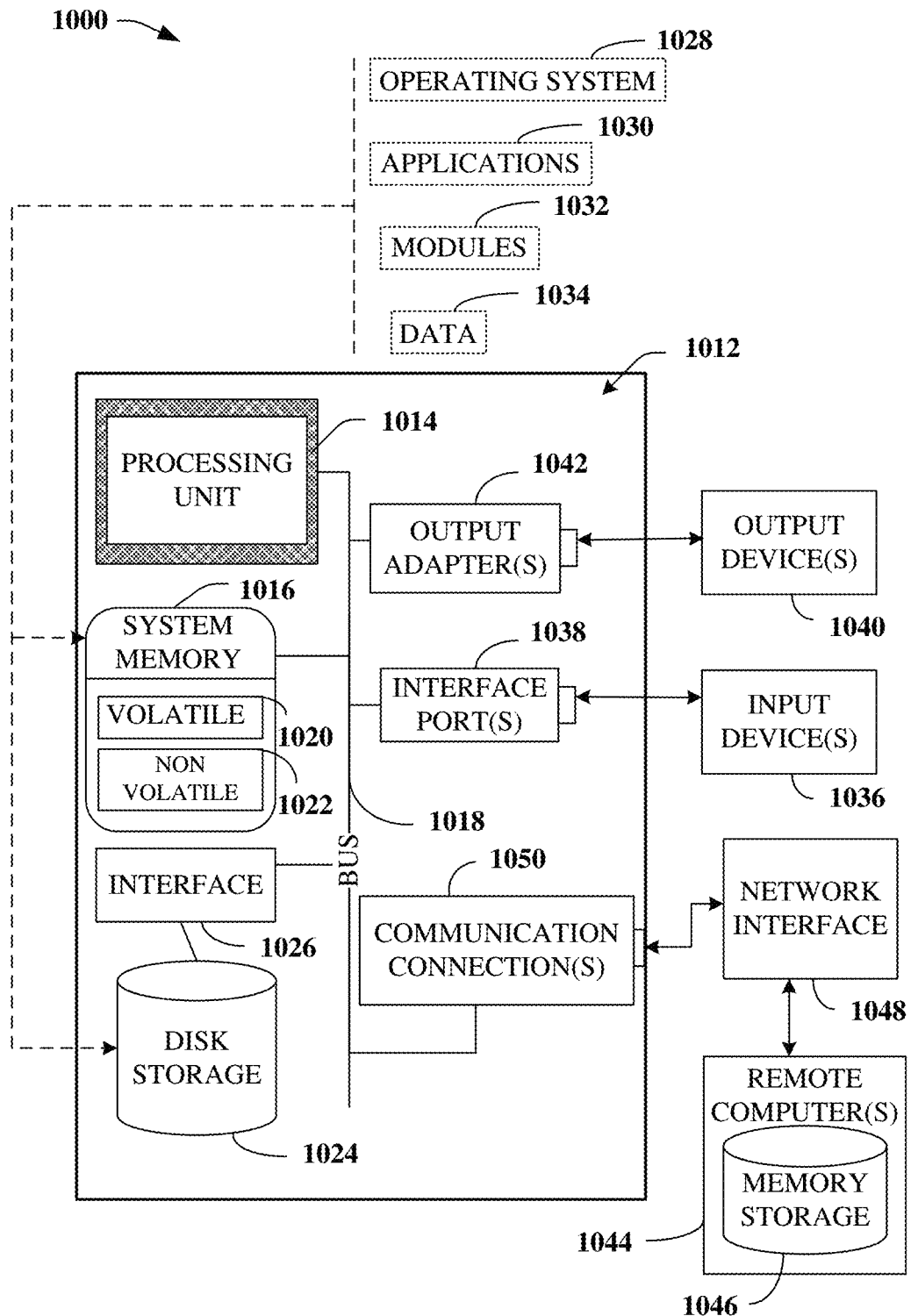
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of mobile device 110, 210, 310, 410, 510, etc., tiered-data component 360, 460, 560, etc., or employing method 600, 700, or 800, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface, such as UI component 112, 212, 312, 412, 512, etc., can be embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, vehicle subsystems, such as headlights, brake lights, stereos, vehicle information sharing device, etc., can include an output adapter 1042 to enable use in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc; femto-cell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A service device, comprising:
a processor; and
a memory that stores executable instructions that, when executed by the processor, facilitate performance of operations, comprising:
receiving, from a vehicle device of a vehicle, a representation of content information that is encrypted according to a key value to enable secured sharing of the representation of the content information with the service device, wherein the representation of the content information is determined by a mobile device that is different from the service device and the vehicle device, and wherein the service device is located proximate to the vehicle and the mobile device; and in response to decrypting the representation of the content information based on the representation of the content information and the key value, initiating access to a determined account.

2. The service device of claim 1, wherein the key value is separately received from the mobile device.

3. The service device of claim 2, wherein the key value is received in response to an input determined to be associated with a user identity.

4. The service device of claim 3, wherein the input is received in response to querying the mobile device for the key value.

5. The service device of claim 1, wherein the representation is an electronic representation and the sharing is via a radio frequency wireless interface, and wherein the service device being proximate to the vehicle is the service device being within a distance allowing the service device to receive a radio frequency signal from the vehicle device via the radio frequency wireless interface.

6. The service device of claim 1, wherein the sharing is via an infrared wireless interface, and wherein the service device being proximate to the vehicle is the service device being within a distance allowing the service device to receive an infrared signal from the vehicle device via the infrared wireless interface.

7. The service device of claim 1, wherein the representation is a tonal representation and the sharing is via an audio signal generated by the vehicle, and wherein the service device being proximate to the vehicle is the service device being within a distance allowing the service device to receive the audio signal from the vehicle device.

8. The service device of claim 7, wherein the audio signal has been generated by the vehicle via an audio system comprising a speaker device.

9. The service device of claim 1, wherein the representation is a visual representation and the sharing is via generation of an image via an image display device of the vehicle, and wherein the service device being proximate to the vehicle is the service device being within a distance allowing the service device to receive the image from the vehicle device via the image display device.

10. The service device of claim 9, wherein the generation of the image comprises generation of a bar code image.

11. The service device of claim 9, wherein the generation of the image comprises generation of a matrix bar code image.

12. The service device of claim 1, wherein the sharing comprises generation of an optical signal by an optical device of the vehicle.

13. The service device of claim 12, wherein the generation of the optical signal comprises pulsing a headlight device.

14. A method, comprising:

receiving, by a service device comprising a processor, a representation of account information from a vehicle device, wherein the representation of account information comprises encrypted account information and is determined by a mobile device that is different from the service device and the vehicle device, wherein the service device is located proximate to a vehicle comprising the vehicle device and is located proximate to the mobile device, and wherein the representation of account information and a key value are together employable by the service device to determine the account information; and in response to determining, by the service device, the account information based on the representation of account information and the key value, accessing an account corresponding to the account information.

15. The method of claim 14, further comprising receiving, by the service device separately from the receiving the representation of account information, the key value via the mobile device.

16. The method of claim 14, wherein the receiving by the service device is in response to the mobile device receiving an external input.

17. The method of claim 14, wherein the receiving the account information occurs in response to a query from the service device.

18. A non-transitory machine-readable storage medium, comprising executable instructions that, when executed by a processor, facilitate performance of operations, comprising:

receiving, by a service device comprising the processor, a representation of content information from a vehicle device, wherein the representation comprises the content information encrypted based on a key value, wherein the representation is determined by a mobile device and provided to the vehicle device by the mobile device for communication to the service device, wherein the service device is located proximate to a vehicle comprising the vehicle device and also proximate to the mobile device, and wherein the content information comprises account information; and accessing the content information based on decrypting the representation based on the key value.

19. The non-transitory machine-readable storage medium of claim 18, wherein the key value is received by the processor separately from the receiving the representation.

20. The non-transitory machine-readable storage medium of claim 19, wherein the receiving the representation is performed in response to a query from the service device.

* * * * *